US010606382B2

(12) United States Patent
Yamamoto

(10) Patent No.: US 10,606,382 B2
(45) Date of Patent: Mar. 31, 2020

(54) STYLUS AND SENSOR CONTROLLER FOR BI-DIRECTIONAL COMMUNICATION USING STYLUS IDENTIFIER

(71) Applicant: Wacom Co., Ltd., Saitama (JP)

(72) Inventor: Sadao Yamamoto, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 41 days.

(21) Appl. No.: 15/842,098

(22) Filed: Dec. 14, 2017

(65) Prior Publication Data
US 2018/0113519 A1 Apr. 26, 2018

Related U.S. Application Data

(63) Continuation of application No. PCT/JP2016/075595, filed on Sep. 1, 2016.

(51) Int. Cl.
G06F 3/038 (2013.01)
G06F 3/0354 (2013.01)
(Continued)

(52) U.S. Cl.
CPC .............. G06F 3/0383 (2013.01); B43L 7/00 (2013.01); G06F 3/038 (2013.01);
(Continued)

(58) Field of Classification Search
CPC .......... B43L 7/00; G06F 3/0416; G06F 3/044; G06F 3/0383; G06F 3/0412; G06F 3/038; G06F 2203/0384; G06F 2203/0382
See application file for complete search history.

(56) References Cited

U.S. PATENT DOCUMENTS 9,459,726 B2 * 10/2016 Katsurahira ........ G06F 3/03545
9,785,272 B1 * 10/2017 Rosenberg ............ G06F 3/0414
(Continued)

FOREIGN PATENT DOCUMENTS

JP  H05-6153 A      1/1993
JP  2004199560 A  *  7/2004  ............. G06F 3/038
(Continued)

OTHER PUBLICATIONS

"JDI, LG, Sharp no Sumaho Muke In-cell/On-cell Sen-ryaku wo Yomu" (English translation: "Read the Strategy of Japan Display Inc., LG Electronics Incorporated, and Sharp Corporation on In-cell/On-cell for Smartphones"), http://techon.nikkeibp.co.jp/article/NEWS/20150121/400160/, Nikkei Technology Online, retrieved Aug. 16, 2016.

Primary Examiner — Kwang-Su Yang
(74) Attorney, Agent, or Firm — Seed IP Law Group LLP

(57) ABSTRACT

Allocation of slots to different styluses is flexibly changed in units of the slot that is shorter than a frame. A stylus bi-directionally transmits and receives signals to and from a sensor controller connected to a sensor via capacitive coupling. The stylus includes a memory that temporarily stores a value of a local ID. The stylus includes a controller that determines whether or not a detected uplink signal includes the value of the local ID stored in the memory every time the uplink signal transmitted by the sensor controller is detected. The controller, in response to determining the detected uplink signal includes the value of the local ID stored in the memory, generates a downlink signal that is based on an operation state and transmits the downlink signal to the sensor controller.

18 Claims, 24 Drawing Sheets

(51) Int. Cl.
  *G06F 3/044* (2006.01)
  *B43L 7/00* (2006.01)
  *G06F 3/041* (2006.01)

(52) U.S. Cl.
  CPC .......... *G06F 3/03545* (2013.01); *G06F 3/044* (2013.01); *G06F 3/0412* (2013.01); *G06F 3/0416* (2013.01); *G06F 2203/0382* (2013.01); *G06F 2203/0384* (2013.01)

(56) References Cited

U.S. PATENT DOCUMENTS

| | | | |
|---|---|---|---|
| 2008/0169132 A1* | 7/2008 | Ding | G06F 3/03545 178/19.02 |
| 2013/0106709 A1* | 5/2013 | Simmons | G06F 3/044 345/173 |
| 2013/0106797 A1 | 5/2013 | Pant et al. | |
| 2013/0194201 A1* | 8/2013 | Zanone | G06F 3/0418 345/173 |

FOREIGN PATENT DOCUMENTS

| | | |
|---|---|---|
| WO | 2015/111159 A1 | 7/2015 |
| WO | 2015/141349 A1 | 9/2015 |

\* cited by examiner

FIG.3
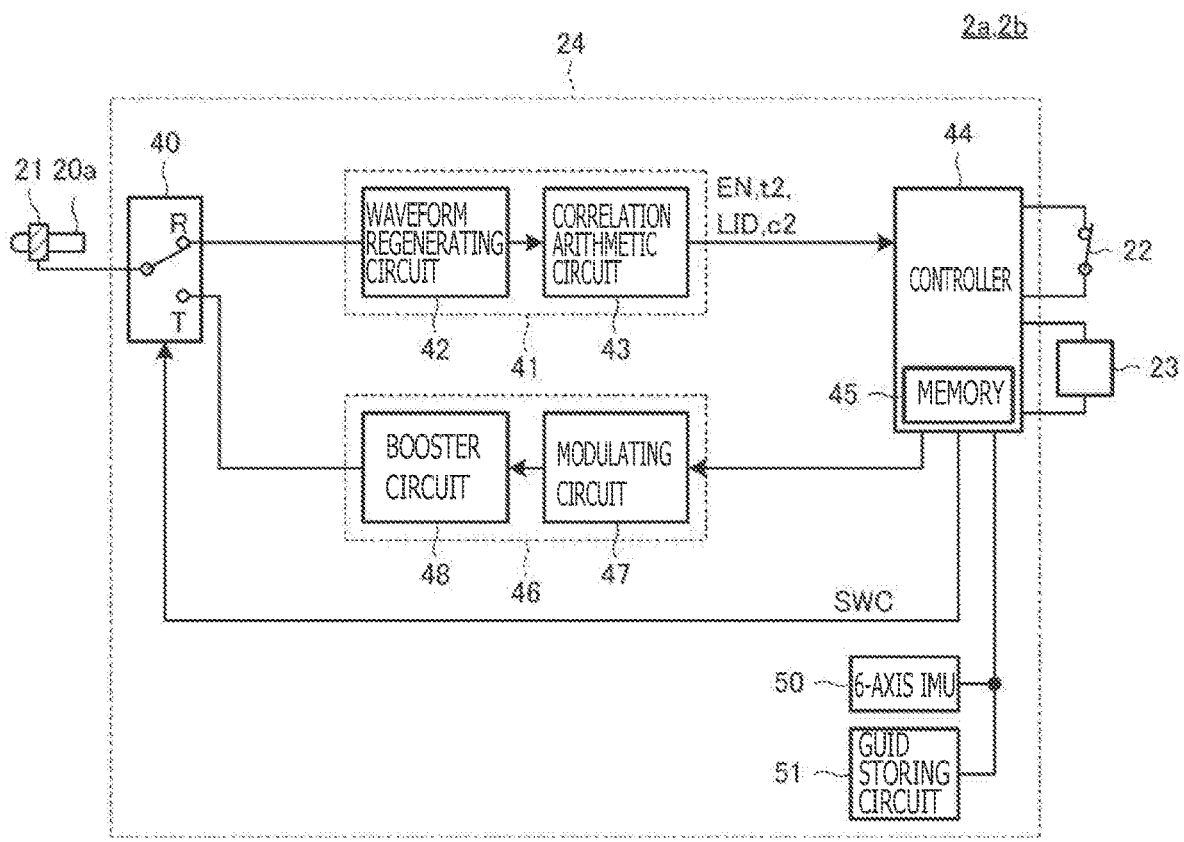
FIG.4
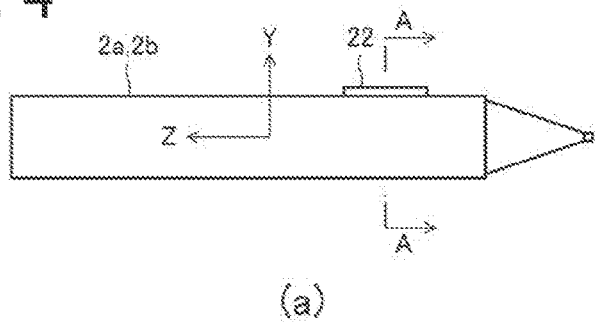
(a)
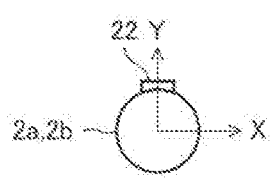
(b)

FIG. 8

| LID | GID | VELOCITY | PRESENT STATE | OPERATION STATE | RESET COMMAND NON-ISSUANCE FLAG 1 | RESET COMMAND NON-ISSUANCE FLAG 2 | DELETION COUNTER | DOWNLINK SIGNAL TRANSMISSION SCHEDULE |
|---|---|---|---|---|---|---|---|---|
| #1 | Ven1 TypeStylus Serial1 | V1[m/s] | PEN-DOWN STATE (WRITING PRESSURE > 0) | NORMAL MODE | FALSE | FALSE | 0 | #S1 |
| #2 | NOT YET ACQUIRED | V2[m/s] (V2<V1) | PEN-DOWN STATE (WRITING PRESSURE = 0) | NORMAL MODE | FALSE | FALSE | 0 | #S2 |
| #3 | Ven1 TypeStylus Serial2 | INDEFINITE | REPLY TO UPLINK SIGNAL IS ABSENT | NORMAL MODE | FALSE | FALSE | 3 | #S3 |
| #4 | Ven1 TypeRuler Serial1 | V3[m/s] | PEN-DOWN STATE | NORMAL MODE | FALSE | FALSE | 0 | #S4 |
| #5 | NOT YET ACQUIRED | INDEFINITE | NOT YET ACQUIRED | NORMAL MODE | FALSE | FALSE | 0 | NOTHING |

70

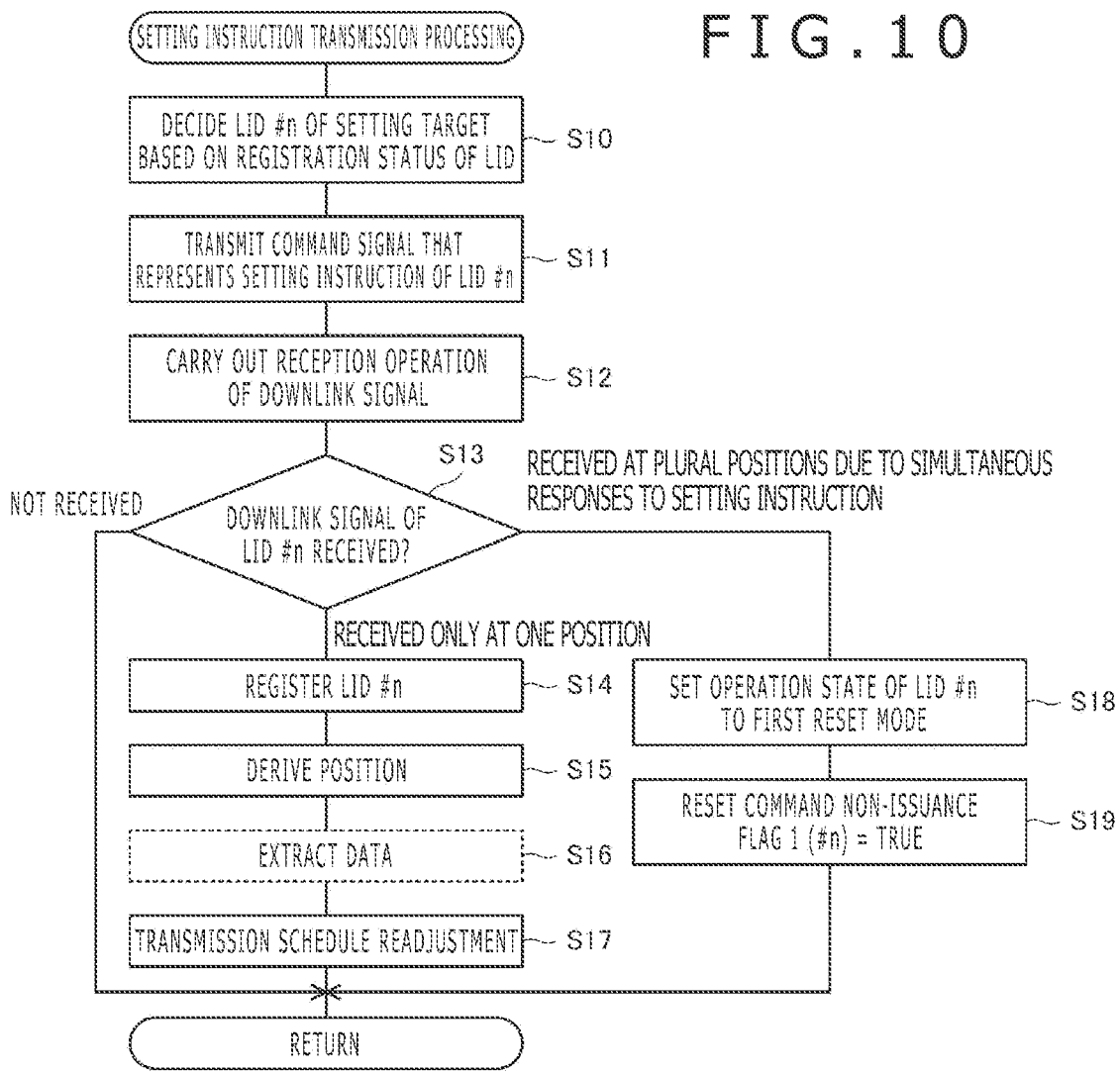

STYLUS AND SENSOR CONTROLLER FOR BI-DIRECTIONAL COMMUNICATION USING STYLUS IDENTIFIER

BACKGROUND

Technical Field

The present disclosure relates to a stylus, a sensor controller, and an electronic ruler, and particularly relates to a stylus, a sensor controller, and an electronic ruler that are compatible with simultaneous use of plural styluses (multi styluses).

Description of the Related Art

An active capacitive system is known as one of position detecting systems, which enables handwritten input by a stylus on a touch surface provided on a surface of an electronic apparatus. Hereinafter, the stylus compatible with the active capacitive system will be referred to as an "active stylus."

The active stylus is configured to be capable of transmitting a signal (downlink signal) to an electronic apparatus. The transmission of the downlink signal is carried out by supplying a transmission signal to an electrode provided at the tip of the active stylus to thereby generate an electric field based on the signal in a space near the electrode. The electronic apparatus has a sensor board including a group of electrodes arranged in a matrix manner disposed on the lower side of a touch surface, and a sensor controller connected to the sensor board. The electronic apparatus is configured to receive the downlink signal through detection, by the sensor controller, of change in the amount of charge generated in the group of electrodes in the sensor board due to the above-described (alternating) electric field. One example of the downlink signal is disclosed in Patent Document 1. The downlink signal according to this example is composed of an unmodulated continuous signal for position detection (position signal) and a signal modulated based on data such as writing pressure information and a unique identifier (ID) (data signal).

In the active capacitive system, the sensor controller in the electronic apparatus is also configured to be capable of transmitting a signal (uplink signal) to the active stylus. The sensor controller transmits the uplink signal toward the stylus by supplying a transmission signal to the group of electrodes that forms the sensor board, to thereby generate an electric field on a panel. The active stylus is configured to detect the uplink signal by detecting the amount of charge induced in the above-described electrode by this electric field. In Patent Document 2, an example of the active stylus that receives the uplink signal is described.

In recent years, the touch surface has been increasingly used additionally as a liquid crystal display surface, as in a so-called tablet computer. In this case, the sensor board is disposed on or inside the liquid crystal panel. The position detecting system in which the sensor board is placed on the liquid crystal panel is called an "out-cell type." In Patent Documents 3 and 4, an example of the position detecting system of the out-cell type is disclosed. Furthermore, among the position detecting systems in which the sensor board is placed in the liquid crystal panel are the "on-cell type" in which the group of electrodes for the sensor board is disposed on a color filter glass or a substrate glass inside the liquid crystal panel, and the "in-cell type" in which common electrodes or pixel electrodes of the liquid crystal panel double as part of the group of electrodes for the sensor board. In Non-patent Document 1, examples of the position detecting systems of the on-cell type and the in-cell type are disclosed.

In the position detecting system of the out-cell type or the on-cell type, it is known that a drive signal in the liquid crystal panel that exists under the sensor board becomes noise and affects the operation of the sensor controller. A representative one of such noise is an AC component of a voltage signal supplied to electrodes for driving the pixels of the liquid crystal panel. This voltage signal is a signal for controlling the orientation of the liquid crystal of the respective pixels, and enters the group of electrodes that forms the sensor board via alternating current (AC) coupling to become noise. Furthermore, in the position detecting system of the in-cell type, the group of electrodes shared for use in both drive operation of the pixels and position detection operation cannot be used for the position detection operation while the driving operation of the pixels is being carried out.

PRIOR ART DOCUMENT

Patent Documents

Patent Document 1: PCT Patent Publication No. WO 2015/111159
Patent Document 2: U.S. Patent Application Publication No. 2013/0106797 Specification
Patent Document 3: Japanese Patent Laid-Open No. 1993-6153
Patent Document 4: PCT Patent Publication No. WO 2015/141349

Non-Patent Document

Non-patent Document 1: "JDI, LG, Sharp no Sumaho Muke In-cell/On-cell Sen-ryaku wo Yomu" (English translation: "Read the Strategy of Japan Display Inc., LG Electronics Incorporated, and Sharp Corporation on In-cell/On-cell for Smartphones"), [online], Nikkei Technology Online, [retrieved on Aug. 16, 2016], Internet <URL:http://techon.nikkeibp.co.jp/article/NEWS/20150121/400160/>

BRIEF SUMMARY

Technical Problems

In view of the above-described challenges faced when a touch surface doubles as a liquid crystal display surface, in recent years, studies have been made on a system in which communication between an active stylus and a sensor controller is carried out by frame communication, in which the display operation period of a liquid crystal panel is defined as one frame and each of plural blank periods (periods in which liquid crystal noise occurs relatively less frequently) that periodically appear in one frame is defined as one slot.

One specification required for the position detecting system is that plural styluses (multi styluses) can be simultaneously used. Therefore, studies are being made on making the above-described frame communication compatible with multi styluses. According to the studies, a sensor controller broadcasts an uplink signal which indicates allocation of a slot to each stylus on each frame basis. Then, each stylus transmits a downlink signal by using the allocated slot. This makes it possible to implement communication between plural active styluses and the sensor controller in a time-divided manner.

However, if the allocation of a slot is indicated to each stylus by the uplink signal in each frame having a fixed time cycle regardless of the display operation rate, etc., the allocation of slots to respective styluses depends on the fixed frame rate. That is, in the above-described system that is being studied, there is a problem that the allocation of slots to respective styluses cannot be flexibly changed in a shorter time than the frame. Furthermore, there is a problem that the scan rate of each stylus is fixed to an integer multiple of the frame rate.

Moreover, in the above-described system that is being studied, there is also a problem that the size of the uplink signal transmitted in one frame to indicate allocation of plural slots inevitably becomes large. If the size of the uplink signal is large, the occupancy ratio of the uplink signal in one frame becomes high and the communication efficiency decreases. Furthermore, it takes a time equivalent to several frames to execute processing of transmitting a signal of a large size to each of plural styluses and checking whether or not the indicated setting has been reflected. Thus, a delay time is introduced before the allocation of the transmission time is actually reflected in all styluses. In the case in which a user uses plural styluses or other devices such as electronic rulers, in such a manner as to frequently make them come closer to and removed from an electronic apparatus, this delay time possibly affects the usage of the plural devices (styluses) by the user.

An electronic ruler is made similarly to a stationery ruler and is one type of electronic stylus. While the movement velocity of a stylus of a general pen type in use is high, the electronic ruler typically is placed at the same position for a while once being put on a panel surface and is used at lower movement velocity compared with the pen-type stylus. Therefore, it is desirable that the scan rate can be changed according to the device (stylus) type.

Moreover, unlike the pen-type stylus used while being held with a hand, the electronic ruler is used in such a manner as to remain placed on the panel surface even while a user is not operating the electronic ruler in some cases. Carrying out transmission and reception of signals between the electronic ruler and the sensor controller in such a case increases the power consumption of the electronic ruler and consumes communication resources between the sensor controller and the stylus (pen type or electronic ruler) even when the electronic ruler is not used.

Therefore, one aspect of the present disclosure is to provide a stylus, a sensor controller, and an electronic ruler with which allocation of the transmission time to each stylus (e.g., a pen type stylus, an electronic ruler) can be flexibly changed in a shorter time than a frame and can be reflected in each stylus.

Furthermore, one aspect of the present disclosure is to provide a stylus, a sensor controller, and an electronic ruler with which the size of an uplink signal to indicate allocation of the transmission time can be made small.

Moreover, one aspect of the present disclosure is to allow the scan rate to be changed according to the type of device (stylus) and characteristics of its usage manner.

In addition, one aspect of the present disclosure is to achieve reduction in the power consumption of an electronic ruler and to achieve effective use of communication resources when the electronic ruler is left on a panel surface.

Technical Solution

A stylus according to the present disclosure bi-directionally transmits and receives signals to and from a sensor controller connected to a sensor via capacitive coupling. The stylus includes a memory that temporarily stores a value of a local identifier. The stylus also includes a processor that, every time an uplink signal transmitted from the sensor controller is detected, determines whether or not the uplink signal that is detected includes the value of the local identifier stored in the memory. The processor, in response to determining the detected uplink signal includes the value of the local ID stored in the memory, generates a downlink signal that is based on an operation state and transmits the downlink signal to the sensor controller.

In the above-described stylus, the processor may generate the downlink signal including the value of the local identifier stored in the memory and transmit the downlink signal to the sensor controller.

A sensor controller according to the present disclosure has a function of detecting one or more styluses, and reports the positions of one or more styluses that have been detected to a host processor. The sensor controller includes a memory that stores values of one or more local identifiers allocated to the respective one or more of the styluses that have been detected. The sensor controller includes a processor that determines a scan rate for each of the one or more styluses that have been detected, and selects one of the values of one or more local identifiers stored in the memory based on the scan rates that are determined. The processor transmits an uplink signal including the selected value of the local identifier, and derives the position of a stylus corresponding to the selected value of the local identifier based on a downlink signal returned in response to the uplink signal.

In the above-described sensor controller, the processor may determine the scan rate for each of the one or more styluses that have been detected based on a device (stylus) type of each of the one or more styluses that have been detected.

An electronic ruler according to the present disclosure includes a ruler portion, a plurality of electrodes provided at the ruler portion, a reception electrode configured to receive an uplink signal transmitted from a sensor controller, and a processor that, in response to reception of the uplink signal, transmits a signal to the sensor controller while sequentially switching between the plurality of electrodes.

An electronic ruler according to another aspect of the present disclosure includes a ruler portion, two or more electrodes provided at the ruler portion, a first switch provided on a top surface of the ruler portion and operable by a user to be switched between a working state and a stop state, and a processor that transmits a downlink signal to the sensor controller using the two or more electrodes if the first switch is in the working state, and that stops transmission processing of the downlink signal if the first switch is in the stop state.

Advantageous Effect

According to the present disclosure, the sensor controller transmits the uplink signal including a value of a local ID at every transmission timing, thereby specifying which stylus should transmit a downlink signal in the corresponding slot. Therefore, it becomes possible to flexibly change allocation of the transmission time for each stylus by (in the units of) a shorter time period than a frame. Furthermore, the allocation schedule need not be stored on the stylus side and therefore the time required for changing the schedule becomes unnecessary. This can improve the response speed for the whole system, regarding change in the scan rate, etc. required when a new stylus is detected. Moreover, by including only one value of a local ID in the uplink signal, it becomes possible for the sensor controller to indicate allocation of the transmission time to each stylus. Thus, it becomes possible to decrease the size of the uplink signal to indicate allocation of plural transmission times in a frame.

Furthermore, according to the present disclosure, the stylus generates the downlink signal including the value of the local ID temporarily stored in the memory and transmits the downlink signal to the sensor controller. Therefore, even when the downlink signals are detected at plural positions on the panel surface, the sensor controller can discriminate between them and identify each stylus, on a stylus by stylus basis. In addition, the number of bits of the local ID can be made smaller compared with the global ID, to be described later. This makes it possible to lower the downlink occupancy ratio necessary for transmitting the local ID.

Moreover, according to the present disclosure, the sensor controller determines the scan rate for each of one or more styluses that have been detected based on the device type of each stylus. It becomes possible to change the scan rate according to the type of the device (stylus) and characteristics of its usage manner.

Furthermore, according to the present disclosure, the electronic ruler is provided with the first switch that is switchable by a user between a working state and a stop state. This achieves reduction in the power consumption of the electronic ruler and achieves effective use of communication resources in case the electronic ruler is left on the panel surface.

BRIEF DESCRIPTION OF THE SEVERAL VIEWS OF THE DRAWINGS

FIG. 3 is a diagram depicting the detailed configuration of a second example of the styluses 2a and 2b depicted in FIG. 1.

FIG. 4 is an explanatory diagram of a six-axis inertial measurement circuit (IMU) 50 depicted in FIG. 3.

FIG. 8 is a diagram depicting an ID management table 70 depicted in FIG. 7.

FIG. 10 is a flowchart depicting a detailed flow of setting instruction transmission processing depicted in FIG. 9.

FIG. 11 is a flowchart depicting a detailed flow of command signal transmission processing depicted in FIG. 9.

DETAILED DESCRIPTION

Preferred embodiments of the present disclosure will be described in detail below with reference to the accompanying drawings.

Figure 1:
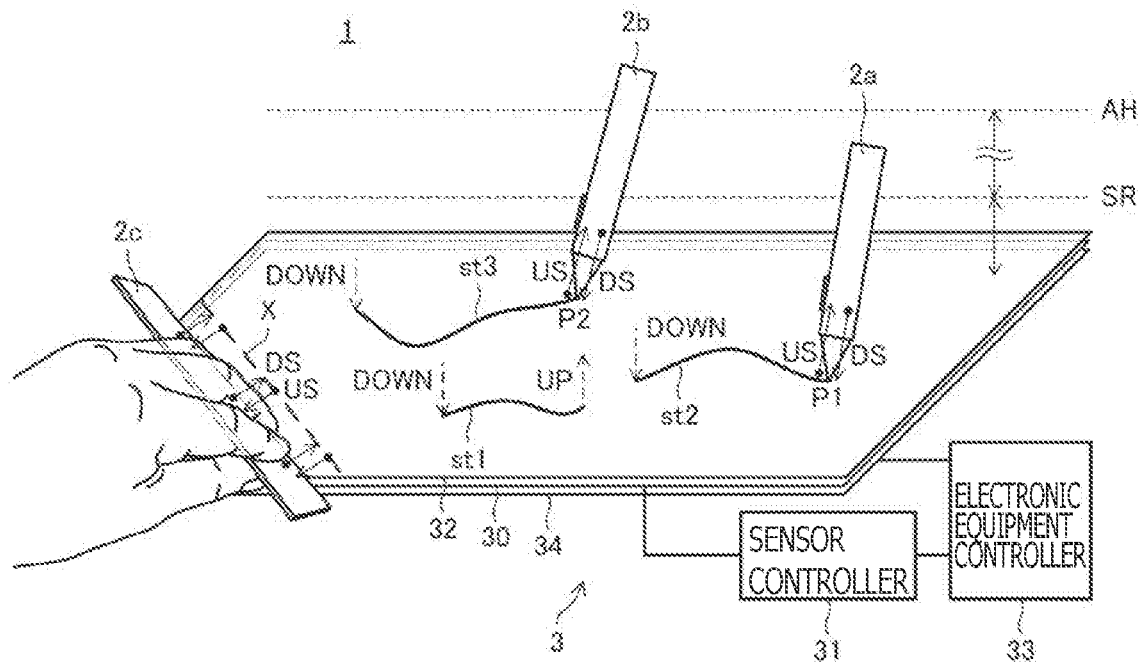
FIG. 1 is a diagram depicting a position detecting system according to an embodiment of the present disclosure.

FIG. 1 is a diagram depicting a position detecting system 1 according to the present embodiment. As depicted in this diagram, the position detecting system 1 is configured to include two pen-type styluses 2a and 2b, one ruler-type stylus 2c, and an electronic apparatus 3. The electronic apparatus 3 is configured to include a sensor electrode 30, a sensor controller 31, a panel 32, an electronic apparatus controller 33 (host processor), and a liquid crystal display 34.

In the position detecting system 1, the sensor controller 31 is a master and the one or more styluses 2 are slaves. The position detecting system 1 is so configured that, when a polling request (a command signal, to be described later) including a local ID is issued from the sensor controller 31, only the stylus 2 having the local ID is permitted to make a reply (transmission of a downlink signal DS, to be described later) in the period of response to the polling. Every time the stylus 2 detects the polling request, the stylus 2 determines whether or not the detected polling request includes the value of the local ID stored in the stylus 2 itself. If determining that the polling request includes the value of the local ID, the stylus 2 transmits the downlink signal DS. The local ID is given to each stylus 2 by the sensor controller 31 and is stored in the stylus 2.

Each of the styluses 2a to 2c is the above-described active stylus, and they are used simultaneously or separately by one or more users. Hereinafter, in some cases, the styluses 2a to 2c will be represented as the stylus 2 when there is no need to particularly discriminate between the styluses 2a to 2c.

For example when using the stylus 2a, a user gradually brings the stylus 2a close to the panel surface of the panel 32 (pen-down; indicated as "DOWN" in FIG. 1) and finally brings the pen tip of the stylus 2a into contact with the panel surface (pen touch). Then, when the user moves the pen tip on the panel surface while maintaining this contact state (pen move), a locus st1 of the movement is rendered on the panel surface based on processing by the electronic apparatus 3, as depicted in the diagram. This rendering is continued until the user removes the pen tip of the stylus 2a from the panel surface (pen-up; indicated as "UP" in FIG. 1). Thereafter, when the user carries out pen-down, pen touch, pen move, and pen-up again, a locus st2 of the movement is similarly rendered on the panel surface based on processing by the electronic apparatus 3. In FIG. 1, a locus st3 generated by pen-down, pen touch, pen move, and pen-up of the stylus 2b is also diagrammatically represented.

The stylus 2c, details of which will be described later, is a special device having plural electrodes arranged in a straight line. Although being a device for digital stationery typically referred to as the "electronic ruler", this device will be referred to as the stylus 2c for simplification of explanation of operation in the present specification. The electronic apparatus 3 is configured to be capable of accepting input of a straight line by the stylus 2c. Specifically, the electronic apparatus 3 is configured to render a virtual line X parallel to the straight-line-shaped pen tip of the stylus 2c on the panel surface when a user brings the pen tip into contact with the panel surface (pen touch).

The styluses 2a to 2c are each configured to receive an uplink signal US transmitted from the sensor controller 31 of the electronic apparatus 3 through the sensor electrode 30, and transmit the downlink signal DS as a response to the uplink signal US. The downlink signal DS is received by the sensor electrode 30 and is supplied from the sensor electrode 30 to the sensor controller 31.

As the uplink signal US, two types of signals exist including a stylus discovery signal and a command signal. The stylus discovery signal is a signal for newly detecting an undetected stylus 2 and is composed of a known detection pattern c1 and a delimiter pattern STP added to the tail end. The detailed contents of the detection pattern c1 and the delimiter pattern STP will be described later. The stylus 2 is configured to intermittently carry out detection operation of the detection pattern c1, and detects the existence of the sensor controller 31 when detecting the detection pattern c1. Furthermore, the stylus 2 that has detected the detection pattern c1 continues the detection operation and synchronizes with the sensor controller 31 based on the timing when the delimiter pattern STP is detected.

Meanwhile, the command signal is a signal for conveying an instruction (command) to the stylus 2 and is configured to include information (local ID) to identify one stylus 2 among one or more styluses 2 that presently exist on the panel surface and an instruction (command) to the identified stylus 2. The stylus 2 acquires a command included in a command signal and executes processing according to the contents thereof if the command signal including the local ID of the stylus 2 is received. This processing includes transmission processing of the downlink signal DS. The local ID is information sufficient for the sensor controller 31 to be able to identify one stylus 2 among one or more styluses 2 present on the panel surface. Thus, the local ID can be information composed of a fewer number of bits compared with a global ID, to be described later. Preferably, the local ID is information that takes a value of at most 4 bits, with which 16 styluses 2 can be identified. 0000b, 1111b, or the like among 4-bit local IDs may be used as a special local ID to identify all or undetected styluses 2, like a so-called broadcast address. Furthermore, in the respective diagrams to be described later, the local ID will be represented as "LID" (abbreviation for local identifier) and the global ID will be represented as "GID" (abbreviation for global identifier).

The downlink signal DS is configured to include a burst signal formed of an unmodulated carrier signal and a data signal formed of a carrier signal modulated based on data (including the local ID allocated to the stylus 2 that is transmitting the downlink signal DS) according to a command. The stylus 2 is configured to transmit the burst signal at first, and subsequently transmit the data signal. The sensor controller 31 of the electronic apparatus 3 is configured to detect the existence of the stylus 2 and the position thereof by receiving the burst signal using the sensor electrode 30. Indicated positions P1 and P2 depicted in FIG. 1 represent examples of the position detected in this manner. The above-described loci st1 to st3 are the loci of movement of these indicated positions P1 and P2.

In order for the sensor controller 31 to detect the stylus 2, the stylus 2 needs to come close to the touch surface of the electronic apparatus 3 to such an extent that the sensor controller 31 can receive the downlink signal DS. A sensing range SR depicted by a dashed line in FIG. 1 is what schematically represents the range in which the sensor controller 31 can receive the downlink signal DS. When the stylus 2 enters this sensing range SR, the sensor controller 31 receives the downlink signal DS through the sensor electrode 30 and thereby becomes capable of detecting the stylus 2. The above-described "pen-down" means such motion of the stylus 2 as to move into the sensing range SR from the outside. Normally the pen-down is carried out by operation of bringing the stylus 2 close to the panel surface of the electronic apparatus 3 by a user. The state in which the stylus 2 has entered the sensing range SR via the "pen-down" operation but has not yet come in contact with the panel surface is referred to as the "hover state."

On the other hand, in some cases, the stylus 2 can receive the uplink signal US transmitted by the sensor controller 31 even when existing outside the sensing range SR. This is because the uplink signal US can be transmitted using all of the electrodes in a matrix disposed in parallel to the panel surface and can be transmitted with higher intensity compared with the downlink signal DS transmitted from an electrode 21 (to be described later) near the tip of the stylus 2. An uplink detection height AH depicted in the diagram represents the limit of the height (distance from the panel surface) at which the stylus 2 can receive the uplink signal US. The uplink detection height AH is at a higher position (position farther from the panel surface) than the upper limit of the sensing range SR.

Figure 2:
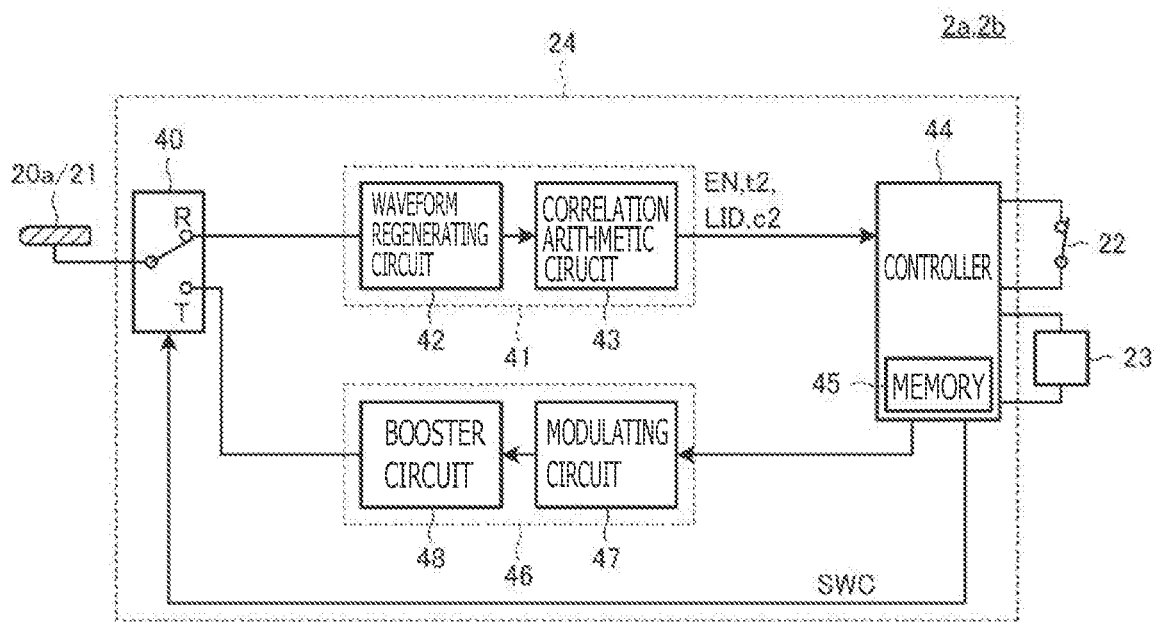
FIG. 2 is a diagram depicting the detailed configuration of a first example of styluses 2a and 2b depicted in FIG. 1.

FIG. 2 is a diagram depicting the detailed configuration of a first example of the styluses 2a and 2b depicted in FIG. 1. The styluses 2a and 2b depicted in this diagram are configured to have a core body 20a, the electrode 21, a switch 22, a writing pressure detecting sensor 23 (writing pressure detecting circuit), and a signal processing circuit 24.

The core body 20a is an electrically-conductive member that forms the pen tip of the stylus 2 and doubles as the electrode 21. The electrode 21 plays a role of an antenna for transmitting the downlink signal DS and also plays a role of an antenna for receiving the uplink signal US transmitted from the sensor controller 31 through the sensor electrode 30. The core body 20a and the electrode 21 may be formed as different members as in FIG. 3 to be described later. Furthermore, an electrode to transmit the downlink signal DS and an electrode to receive the uplink signal US may be separately provided.

The switch 22 is a switch that takes either an on-state or an off-state by operation of a user, such as a side switch provided on the side surface of the stylus 2 or a tail switch provided at the end portion. The writing pressure detecting sensor 23 is a pressure sensor for detecting the pressure (writing pressure) applied to the tip of the core body 20a. Specifically, the writing pressure detecting sensor 23 can be formed using a known such as a variable-capacitance capacitor whose capacitance changes according to the pressure, or a pressure sensor whose resistance value changes according to the pressure, for example.

The signal processing circuit 24 has functions of receiving the uplink signal US from the sensor controller 31 through the electrode 21 to execute processing according to the contents thereof and generating the downlink signal DS to be transmitted to the sensor controller 31 to transmit the downlink signal DS toward the sensor controller 31 through the electrode 21. Specifically, the signal processing circuit 24 is configured to include a switching circuit 40, a receiving circuit 41, a controller 44, and a transmitter circuit 46. Each of them will be described below in turn.

The switching circuit 40 is a one-circuit-two-contact switch element configured in such a manner that a common terminal is connected to either one of a T-terminal or an R-terminal. The common terminal of the switching circuit 40 is connected to the electrode 21. The T-terminal is connected to the output terminal of the transmitter circuit 46 and the R-terminal is connected to the input terminal of the receiving circuit 41. The state of the switching circuit 40 is controlled by a control signal SWC from the controller 44. In the case of receiving the uplink signal US from the sensor controller 31, the controller 44 controls the switching circuit 40 by the control signal SWC so that the R-terminal may be connected to the common terminal. Furthermore, in the case of transmitting the downlink signal DS to the sensor controller 31, the controller 44 controls the switching circuit 40 by the control signal SWC so that the T-terminal may be connected to the common terminal. In the initial state, i.e., in the period until the stylus 2 detects the detection pattern c1 to be described later, the controller 44 may enter a sleep state in which the on-state and the sleep-state are repeated to carry out reception operation only intermittently in order to reduce the power consumption of the stylus 2, after fixing the switching circuit 40 to the state in which the R-terminal is connected to the common terminal.

The receiving circuit 41 is a circuit that carries out reception of a signal supplied from the switching circuit 40 (signal that has arrived at the electrode 21) and decoding of a chip sequence included in the received signal. In this example, the receiving circuit 41 is configured to include a waveform regenerating circuit 42 and a correlation arithmetic circuit 43. The receiving circuit 41 is configured to be capable of detecting the above-described detection pattern c1, the delimiter pattern STP, the local ID, and the command, respectively, by this decoding. The receiving circuit 41 carries out the reception operation only intermittently until the detection pattern c1 is detected in order to reduce the power consumption of the stylus 2, as described above.

The waveform regenerating circuit 42 binarizes the level of the charge (voltage) induced in the electrode 21 with a clock of several times (for example four times) the chip rate of a spreading code PN (described later) used when the sensor controller 31 carries out spreading of the uplink signal US to shape the level into a binary sequence (chip sequence) of positive and negative polarity values and output the binary sequence. The correlation arithmetic circuit 43 decodes the chip sequence included in the received signal by storing the chip sequence output by the waveform regenerating circuit 42 in a register and performing correlation operation with the spreading code PN (or code obtained by carrying out at least either one of inversion and cyclic shift for this spreading code PN) while sequentially shifting the chip sequence with the above-described clock.

The receiving circuit 41 sequentially carries out determination of whether or not the values of symbols obtained by the decoding of the correlation arithmetic circuit 43 represent the detection pattern c1. When detecting the detection pattern c1, the receiving circuit 41 detects the existence of the sensor controller 31 and issues, to the controller 44, an activation signal EN for enabling execution of processing or the like according to a command represented by a command signal.

Furthermore, if the detection pattern c1 is detected, the receiving circuit 41 switches the reception operation from intermittent operation to continuous operation based on an instruction from the controller 44 activated by the above-described activation signal EN and sequentially carries out determination of whether or not the values of symbols obtained by decoding represent the above-described delimiter pattern STP. When detecting the delimiter pattern STP, the receiving circuit 41 outputs a detection clock time t2 thereof to the controller 44.

The receiving circuit 41 after detecting the delimiter pattern STP carries out reception operation of the command signal transmitted by the sensor controller 31 in accordance with control by the controller 44. Specifically, the receiving circuit 41 acquires a set of a local ID and control information c2 (information including an instruction by the sensor controller 31) from the values of a series of symbols obtained by the correlation arithmetic circuit 43 while the reception operation is being carried out, and outputs the set to the controller 44.

The controller 44 is formed of a microprocessor (MCU) and is triggered to be activated by supply of the activation signal EN from the receiving circuit 41. The processing executed by the activated controller 44 includes, besides the above-described switching from intermittent reception operation to continuous reception operation, processing of causing the receiving circuit 41 to receive a command signal, processing of determining its own local ID and temporarily storing the local ID in a memory 45, and processing of causing the transmitter circuit 46 to transmit the downlink signal DS. The processing of causing the receiving circuit 41 to receive a command signal includes processing of supplying the control signal SWC for connecting the R-terminal to the common terminal to the switching circuit 40. Similarly, the processing of causing the transmitter circuit 46 to transmit the downlink signal DS includes processing of supplying the control signal SWC for connecting the T-terminal to the common terminal to the switching circuit 40.

When being supplied with the detection clock time t2 from the receiving circuit 41, first the controller 44 executes the processing of causing the receiving circuit 41 to receive a command signal. As described in detail later, the sensor controller 31 is configured to transmit a command signal that represents a setting instruction of the local ID (an uplink signal for detecting a new stylus that is not included in one or more styluses that have been detected) immediately after transmitting the stylus discovery signal composed of repetition of the detection pattern c1 and the delimiter pattern STP. When receiving the command that represents this setting instruction from the receiving circuit 41, the controller 44 in the initial state in which a local ID has not yet been stored in its memory 45 determines the local ID represented by the command as its own local ID and stores the local ID in the memory 45. From then on, every time a set of a local ID and a command is supplied from the receiving circuit 41 to the controller 44, the controller 44 determines whether or not the local ID therein corresponds with the local ID stored in the memory 45 and executes processing according to the command included in the set (including the processing of causing the transmitter circuit 46 to transmit the downlink signal DS) only if the local IDs correspond with each other. Furthermore, the controller 44 executes processing of deleting the local ID stored in the memory 45 if a predetermined time has elapsed from the last reception of supply of the set of a local ID and a command. The memory 45 holds the value of the local ID given by the sensor controller 31 only temporarily and therefore may be a volatile memory differently from a global ID storing circuit 51, to be described later.

The downlink signal DS, which the transmitter circuit 46 is caused to transmit by the controller 44, includes a burst signal and a data signal, as described above. When causing the burst signal to be transmitted, the controller 44 causes the transmitter circuit 46 to transmit an unmodulated carrier signal. On the other hand, when transmitting the data signal, the controller 44 acquires data instructed to be transmitted by a command supplied from the receiving circuit 41 and supplies the data to the transmitter circuit 46 together with the local ID stored in the memory 45. Due to this, the downlink signal DS to be transmitted from the transmitter circuit 46 becomes a signal including the data instructed to be transmitted by the command and the local ID. The data instructed to be transmitted by the command includes data based on the operation state of the stylus 2 at the timing when the command is received, such as data that represents the on-/off-state of the switch 22 and data that represents a writing pressure detected by the writing pressure detecting sensor 23.

The transmitter circuit 46 is a circuit that generates the downlink signal DS according to control by the controller 44 and supplies the downlink signal DS to the electrode 21, and is composed of a modulating circuit 47 and a booster circuit 48.

The modulating circuit 47 is a circuit that generates a carrier signal (for example square wave signal) with a predetermined frequency or a frequency in accordance with control from the controller 44 and outputs the carrier signal as is (un-modulated) or after modulating it based on control by the controller 44. The modulating circuit 47 at the time of transmission of the burst signal outputs the carrier signal as is without modulation in accordance with an instruction of the controller 44. A signal obtained by modulation with a pattern of known values may be used as the burst signal, and the modulating circuit 47 in this case outputs the carrier signal after modulating it with the above-described pattern of known values. On the other hand, the modulating circuit 47 at the time of transmission of the data signal modulates (on-off-keying (OOK), phase-shift keying (PSK), or the like) the carrier signal based on data supplied from the controller 44 and outputs a modulated signal obtained as a result.

The booster circuit 48 is a circuit that generates the downlink signal DS by boosting the output signal of the modulating circuit 47 to certain amplitude. The downlink signal DS generated by the booster circuit 48 is sent, through the switching circuit 40, out from the electrode 21 to a space.

FIG. 3 is a diagram depicting the detailed configuration of a second example of the styluses 2a and 2b depicted in FIG. 1. The styluses 2a and 2b depicted in this diagram are different from the styluses 2a and 2b depicted in FIG. 2 in that the core body 20a and the electrode 21 are formed of different members and a six-axis inertial measurement circuit (IMU) 50 and the global ID storing circuit 51 are included in the signal processing circuit 24. In the following, description will be made with focus on the differences from the styluses 2a and 2b depicted in FIG. 2.

The core body 20a according to the present example is formed of an insulating member that forms the pen tip of the stylus 2. The electrode 21 is an electrically-conductive member provided near the tip of the core body 20a. The role of the electrode 21 is the same as the electrode 21 depicted in FIG. 2.

The six-axis IMU 50 is an inertial measurement circuit including a three-axis acceleration sensor and a three-axis gyro sensor and is configured to output a value that represents a measurement result to the controller 44.

FIG. 4 is an explanatory diagram of the six-axis IMU 50. FIG. 4(a) depicts a diagram obtained when the stylus 2a or 2b is viewed from a lateral side and FIG. 4(b) depicts a section of the stylus 2a or 2b corresponding to line A-A depicted in FIG. 4(a).

As depicted in FIG. 4(a), the six-axis IMU 50 uses the longitudinal direction of the stylus 2a or 2b as the Z-axis. Furthermore, as depicted in FIG. 4(b), the six-axis IMU 50 uses the direction from the center of the section of the stylus 2a or 2b toward the switch 22 as the Y-axis and uses the direction perpendicular to both the Z-axis and the Y-axis as the X-axis. The six-axis IMU 50 acquires the acceleration and angular velocity of the stylus 2a or 2b regarding the direction of each of these axes including X-axis to Z-axis and outputs the acceleration and the angular velocity to the controller 44.

Referring back to FIG. 3, the global ID storing circuit 51 stores a global ID, which is information different for each stylus 2. The global ID is e.g., 64-bit information that represents an identifier of the vendor of the stylus 2, an identification number of the stylus 2 in the vendor, the device type of the stylus 2 (pen type, ruler type, or the like), and so forth. The global ID is written to the global ID storing circuit 51 at the timing of manufacturing of the stylus 2. As the global ID storing circuit 51, a non-volatile memory is used differently from the volatile memory 45. The global ID and the local ID are different from each other in that the global ID is an identifier that includes the identifier of the vendor and so forth and is globally unique whereas the local ID is an identifier for the sensor controller 31 to locally identify one of plural styluses 2 that exist in the detection range of the sensor controller 31.

If the styluses 2a and 2b have the configuration depicted in FIG. 3, in the data instructed to be transmitted by the sensor controller 31 with a command signal, the measurement result of the six-axis IMU 50 and the global ID are included in addition to the above-described data based on the operation state of the stylus 2. The controller 44 in the case in which the controller 44 is instructed to transmit the measurement result of the six-axis IMU 50 acquires data that represents the measurement result from the six-axis IMU 50 and supplies the data to the transmitter circuit 46 as data to be transmitted. Similarly, the controller 44 in the case in which the controller 44 is instructed to transmit the global ID reads out the global ID from the global ID storing circuit 51 and supplies the global ID to the transmitter circuit 46 as data to be transmitted.

Figure 5:
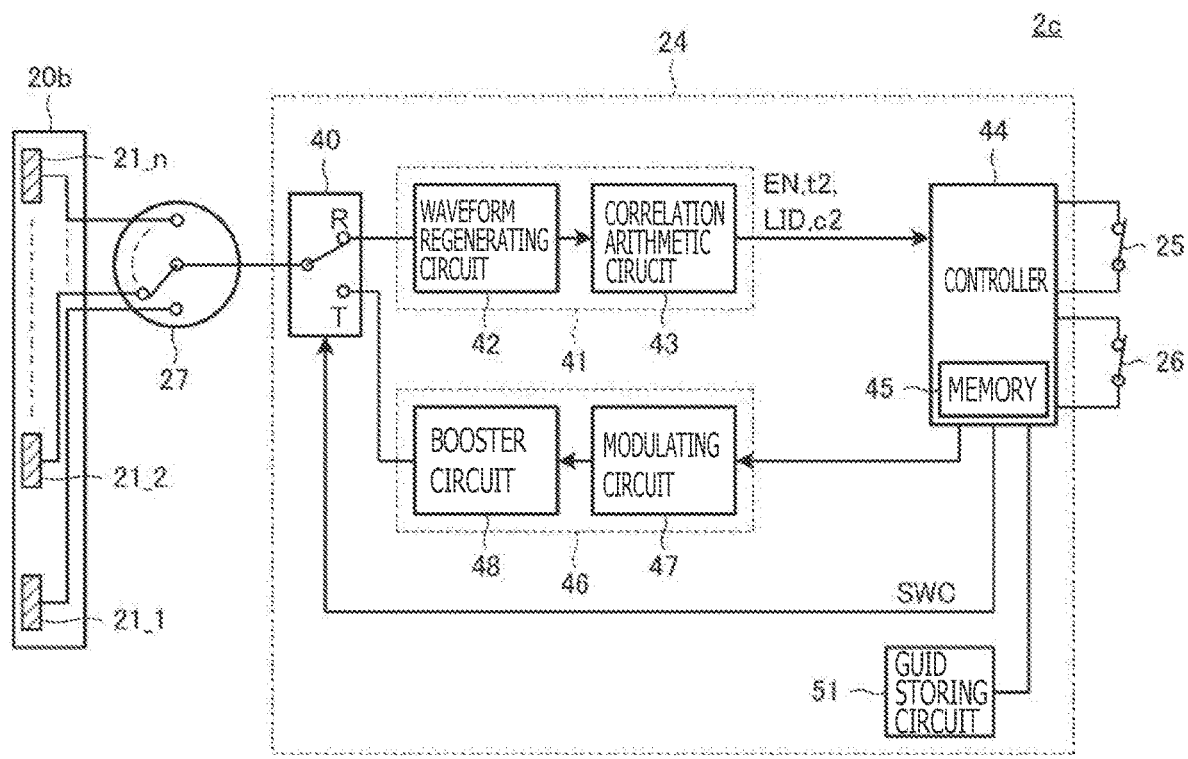
FIG. 5 is a diagram depicting the detailed configuration of a stylus 2c (ruler-type device) depicted in FIG. 1.
Figure 6:
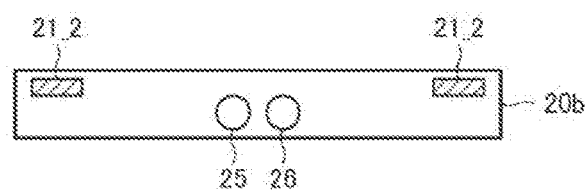
FIG. 6 is a top view of the stylus 2c (ruler-type device) depicted in FIG. 1.

FIG. 5 is a diagram depicting the detailed configuration of the stylus 2c (ruler-type device) depicted in FIG. 1. Furthermore, FIG. 6 is a top view of the stylus 2c. As depicted in these diagrams, the stylus 2c is different from the styluses 2a and 2b depicted in FIG. 3 in that the stylus 2c has a ruler 20b (ruler portion) instead of the core body 20a, in that the stylus 2c has n electrodes 21_1 to 21_n, in that the stylus 2c has a switching circuit 27, in that the stylus 2c has two switches 25 and 26 instead of the switch 22 and the writing pressure detecting sensor 23, and in that the stylus 2c does not have the six-axis IMU 50. In the following, description will be made with focus on the differences from the styluses 2a and 2b depicted in FIG. 3.

The ruler 20b is an insulating member having a thin plate shape and is made in a form similar to a stationery ruler. The electrodes 21_1 to 21_n are each an electrically-conductive member having a thin plate shape and are disposed in at least two positions at one end and the other end of the ruler 20b in the longitudinal direction. In the example of FIG. 5, three or more electrodes 21 are disposed to be lined at equal intervals inside the ruler 20b from one end to the other end of the ruler 20b along the longitudinal direction of the ruler 20b. Furthermore, in the example of FIG. 6, two electrodes 21 are disposed at one end and the other end, respectively, of the ruler 20b in the longitudinal direction. The electrodes 21_1 to 21_n each play a role of an antenna for transmitting the downlink signal DS and also play a role of an antenna for receiving the uplink signal US transmitted from the sensor controller 31 through the sensor electrode 30, similarly to the electrode 21 depicted in FIG. 2 and FIG. 3. The electrode 21 may be used exclusively for transmission, and a reception electrode may be separately provided. In this case, the reception electrode may receive the uplink signal US according to another proximity wireless communication method, such as Bluetooth®, for example.

The switching circuit 27 is a one-circuit-n-contact switch element configured in such a manner that a common terminal is connected to one of n electrode-side terminals. The common terminal of the switching circuit 27 is connected to the common terminal of the switching circuit 40, and the n electrode-side terminals of the switching circuit 27 are connected to the electrodes 21_1 to 21_n, respectively, in one-to-one correspondence.

The switch 25 (first switch) is a switch for switching the stylus 2c between a working state and a stop state. Furthermore, the switch 26 (second switch) is a switch for causing the electronic apparatus 3 supported by the sensor controller 31 to activate predetermined processing, such as finalizing (fixing) a virtual line to be described later. These switches 25 and 26 are provided on the top surface of the ruler 20b, preferably near the center in the longitudinal direction, as exemplified in FIG. 6.

The controller 44, in the period from when the switch 25 is pressed by a user until when the switch 26 is pressed down by the user, causes the transmitter circuit 46 to transmit the downlink signal DS every time a command corresponding to the local ID allocated to itself is supplied from the receiving circuit 41. At this time, the switching circuit 27 carries out operation of switching the electrode-side terminal as the connection target of the common terminal every time the downlink signal DS is transmitted. Due to this, the downlink signal DS is transmitted from each of the electrodes 21_1 to 21_n in turn.

The sensor controller 31 orders transmission of a global ID by a command signal, and checks the global ID transmitted from the stylus 2c in response thereto, to thereby recognize the stylus 2c to be a ruler-type device. The sensor controller 31 is configured to store plural positions identified based on the sequentially received downlink signal DS, and display the virtual line X (see FIG. 1) that links them for the stylus 2c recognized to be a ruler-type device.

Furthermore, the controller 44 is so configured that, when the user presses down the switch 26 (second switch), data indicating the pressing-down is made to be included in the downlink signal DS and the transmitter circuit 46 is caused to transmit the downlink signal DS. By receiving this data, the sensor controller 31 notifies the electronic apparatus controller 33 of data for finalizing (fixing) the position of the virtual line X.

The movement velocity of the pen-type stylus 2 like the styluses 2a and 2b while the stylus 2 is being used is high. In contrast, the ruler-type stylus 2 like the stylus 2c is placed in the same position for a while once being put on a panel surface and is used at lower movement velocity compared with the pen-type stylus 2 in many cases. Therefore, a high scan rate does not need to be allocated to the ruler-type stylus 2 in many cases. Thus, the sensor controller 31 according to the present embodiment sets the scan rate low regarding the stylus 2 recognized to be a ruler type through a check of the global ID. Details thereof will be described later.

Moreover, differently from the pen-type stylus 2 used while being held with a hand, the ruler-type stylus 2 is used in such a manner as to remain placed on the panel surface even while a user is not operating the ruler-type stylus 2 in some cases. Carrying out transmission and reception of signals between the ruler-type stylus 2 and the sensor controller 31 in such a case increases the power consumption of the ruler-type stylus 2 and consumes communication resources between the sensor controller 31 and the respective styluses 2 even when the ruler-type stylus 2 is not in use. The stylus 2c according to the present embodiment is configured to allow the user to specify the transmission period of the downlink signal DS by operation of the switches 25 and 26. This achieves reduction in the power consumption of the stylus 2c and achieves effective use of communication resources in the case in which the stylus 2c is left on the panel surface.

Figure 7:
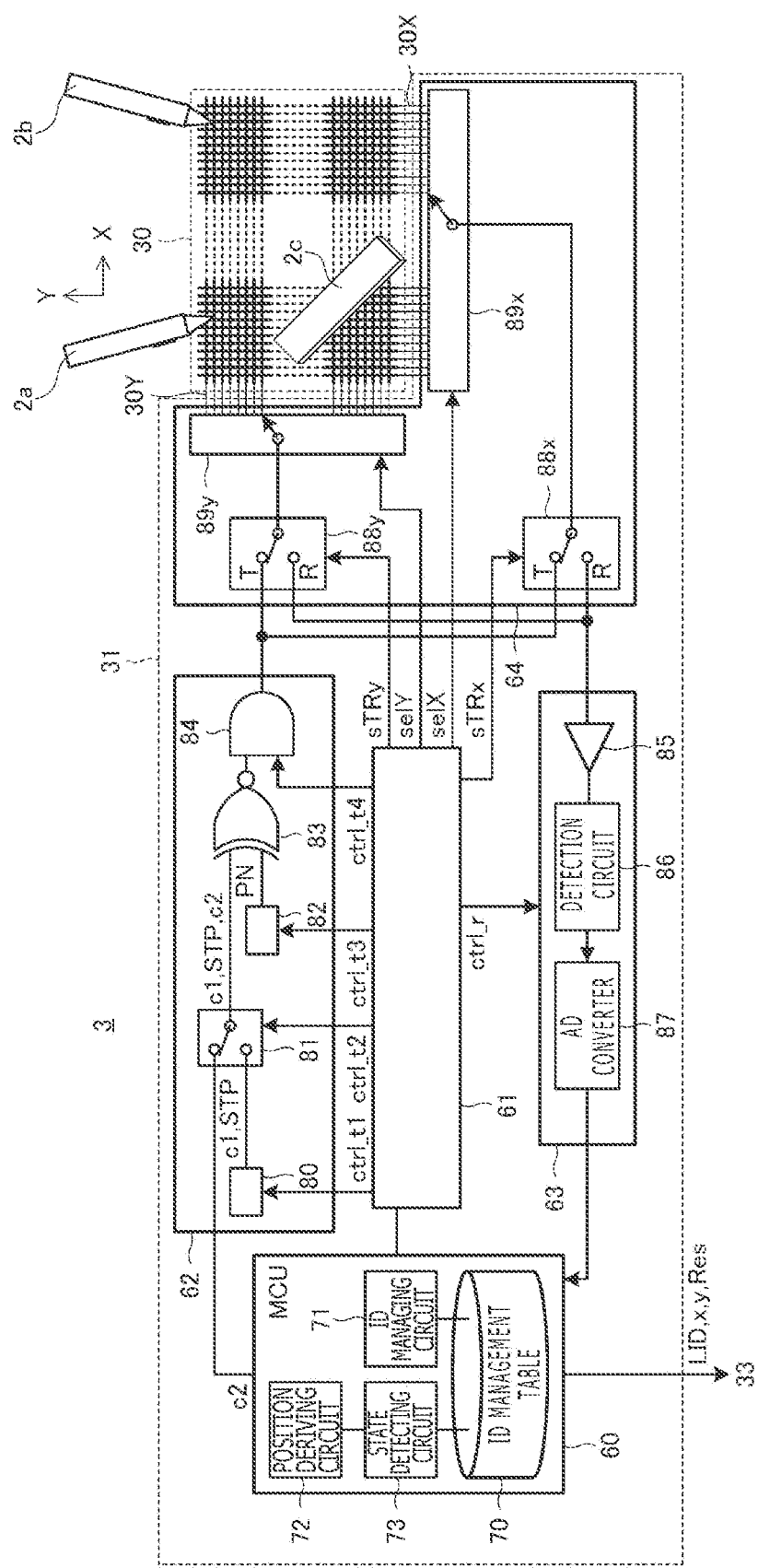
FIG. 7 is a diagram depicting the detailed configuration of an electronic apparatus 3 depicted in FIG. 1.

Next, FIG. 7 is a diagram depicting the detailed configuration of the electronic apparatus 3 depicted in FIG. 1. The configuration and operation of the electronic apparatus 3 will be described in detail below with reference to FIG. 7.

The sensor electrode 30 is composed of plural linear electrodes 30X that each extends in the X-direction and plural linear electrodes 30Y that each extends in the Y-direction. The sensor electrode 30 is configured to be capacitively coupled to the stylus 2 by these linear electrodes 30X and 30Y. The above-described uplink signal US and downlink signal DS are transmitted and received through this capacitive coupling.

As depicted in FIG. 7, the sensor controller 31 includes an MCU 60, a logic circuit 61, a transmitter circuit 62, a receiver circuit 63, and a selection circuit 64.

The MCU 60 and the logic circuit 61 are controllers that control transmission-reception operation of the sensor controller 31 by controlling the transmitter circuit 62, the receiver circuit 63, and the selection circuit 64. Specifically, the MCU 60 is a microprocessor that internally has a read only memory (ROM) and a random access memory (RAM) and operates based on a predetermined program. Meanwhile, the logic circuit 61 is configured to output control signals ctrl_t1 to ctrl_t4 and ctrl_r based on control by the MCU 60.

As depicted in FIG. 7, the MCU 60 internally has a memory that stores an ID management table 70. Furthermore, the MCU 60 includes an ID managing circuit 71, a position deriving circuit 72, and a state detecting circuit 73.

FIG. 8 is a diagram depicting the ID management table 70. As depicted in this diagram, the ID management table 70 is a table that stores, regarding each local ID, the global ID, the velocity, the present state, the operation state, reset command non-issuance flag 1, reset command non-issuance flag 2, a deletion counter, and a downlink signal transmission schedule.

The ID managing circuit 71 carries out registration and deletion of local IDs stored in the ID management table 70. Specifically, the ID managing circuit 71 supplies the control information c2 including a setting instruction of a local ID that has not yet been registered in the ID management table 70 to the transmitter circuit 62 and controls the transmitter circuit 62 to transmit a command signal that represents this control information c2. Then, when the stylus 2 that has received this command signal transmits the downlink signal DS including the indicated local ID, the ID managing circuit 71 receives this downlink signal DS through the receiver circuit 63 and determines whether or not the local ID instructed to be set is included. If the result of this determination is positive, the ID managing circuit 71 executes processing of registering the value of the local ID in the ID management table 70. As for deletion of a local ID, detailed description will be provided later with reference to a flowchart of FIG. 12.

The ID managing circuit 71 supplies, to the transmitter circuit 62, the control information c2 including a transmission instruction of various types of data other than the local ID (data that represents the on-/off-state of the switch 22 depicted in FIG. 2, data that represents the writing pressure detected by the writing pressure detecting sensor 23 depicted in FIG. 2, data that represents the measurement result of the six-axis IMU 50 depicted in FIG. 3, the global ID stored in the global ID storing circuit 51 depicted in FIG. 3, etc.), and controls the transmitter circuit 62 to transmit a command signal that represents this control information c2. At this time, the control information c2 supplied to the transmitter circuit 62 includes the local ID of the stylus 2 as the destination of the transmission instruction. As described above, the stylus 2 is so configured that, only when the local ID included in the received command signal corresponds with the local ID allocated to itself, the stylus 2 transmits the downlink signal DS including the local ID and data instructed to be transmitted by a command. When receiving the downlink signal transmitted in this manner through the receiver circuit 63, the ID managing circuit 71 executes processing of detecting the local ID and the data included in it. Then, the ID managing circuit 71 reports, to the electronic apparatus controller 33 (see FIG. 1), the detected local ID and data (in FIG. 7, represented as Res (meaning response data)) together with coordinates x and y derived by the position deriving circuit 72, to be described later. Furthermore, if a global ID is included in the detected data, the ID managing circuit 71 also executes processing of writing the global ID to the ID management table 70.

The ID managing circuit 71 determines the transmission schedule of the downlink signal DS for each of one or more local IDs stored in the ID management table 70, and writes the transmission schedule to the ID management table 70. This transmission schedule is composed of two types of parameters, which are the transmission frequency (scan rate) of the downlink signal DS and the continuous transmission time of the downlink signal DS. By default, the ID managing circuit 71 sets each of the scan rate and the continuous transmission time of the downlink signal DS to an equal value for all local IDs registered in the ID management table 70.

The scan rate of the ruler-type stylus 2 can be lower than the scan rate of the pen-type stylus 2. This is because, with the ruler-type stylus 2, movement on a panel surface is thought to be slower than the pen-type stylus 2. For a similar reason, with respect to the stylus 2 determined to be not moving based on the movement velocity (as calculated by the state detecting circuit 73 to be described later), the scan rate can be lower than the stylus 2 determined to be moving. Furthermore, the continuous transmission time of the downlink signal DS for each of the styluses 2 may differ depending on the specification of each stylus 2. For example, the stylus 2 of a certain vendor may be configured to continue transmission of the downlink signal DS for a time period twice as long as that of the stylus 2 of another vendor.

Therefore, the ID managing circuit 71 acquires the global ID (device type, or stylus type) or the movement velocity of the stylus 2, and based thereon determines the optimum scan rate and continuous transmission time of the downlink signal DS for the stylus 2, to thereby carry out readjustment of the transmission schedule of the downlink signal DS. Specifically, the ID managing circuit 71 determines the scan rate for each of one or more local IDs stored in the ID management table 70, so as to assign higher scan rates to the higher movement velocity, and writes the scan rates to the ID management table 70. Further specifically, the ID managing circuit 71 determines the continuous transmission time of the downlink signal DS for each stylus 2 based on the device type (stylus type) of each stylus 2 and writes the continuous transmission time to the ID management table 70. This readjustment will be described in more detail later with reference to FIG. 23 and FIG. 24.

The transmission schedule of the downlink signal DS written to the ID management table 70 is implemented through control, by the ID managing circuit 71, of the transmission frequency of the command signal addressed to each local ID and the transmission interval of the command signal. Specifically, the ID managing circuit 71 implements the scan rate set in the ID management table 70 by controlling the transmission frequency of the command signal addressed to each local ID. For example, if two local IDs #1 and #2 are set in the ID management table 70 and the respective scan rates are both 1/2, the ID managing circuit 71 alternately transmits command signals addressed to a respective one of local IDs #1 and #2. Furthermore, if two local IDs #1 and #2 are set in the ID management table 70 and the scan rate of local ID #1 is 1/4 and the scan rate of local ID #2 is 3/4, the ID managing circuit 71 transmits the command signal at such a frequency that the ID managing circuit 71 transmits a command signal addressed to local ID #1 one time and then transmits a command signal addressed to local ID #2 three times. Moreover, the ID managing circuit 71 implements the continuous transmission time of the downlink signal DS set in the ID management table 70 by controlling the transmission interval of the command signal. Specifically, because the sensor controller 31 receives the downlink signal DS during the transmission interval of the command signal, the continuous detection operation time for the downlink signal DS becomes longer when the transmission interval of the command signal is set longer, for example. This way, a long continuous transmission time can be set for the downlink signal DS. The sensor controller 31 determines the polling schedule of issuance of the uplink signals US, which are transmission request commands including the respective IDs, so that the downlink signal DS is transmitted from each stylus 2 in a manner that conforms with the transmission schedule of the downlink signal DS. In accordance with this polling schedule, the uplink signals US including the respective local IDs are transmitted.

The position deriving circuit 72 acquires the reception intensity of the downlink signal DS at each of the respective plural linear electrodes 30X and 30Y based on a digital signal supplied from the receiver circuit 63, and executes processing of deriving coordinates x and y that represent the position of the stylus 2 based on the result.

The state detecting circuit 73 executes processing of calculating the movement velocity of each stylus 2 from change in the position derived by the position deriving circuit 72 regarding each local ID, and writing the movement velocity to the ID management table 70. Furthermore, the state detecting circuit 73 executes processing of, regarding each local ID, determining whether or not the downlink signal DS as a response to the uplink signal US has been received, and if the downlink signal DS has been received, determining whether the value of the writing pressure included is 0 or is larger than 0, and writing the result to the ID management table 70 as the present state of the stylus 2. Specifically, as depicted in FIG. 8, for the local ID regarding which the downlink signal DS in response to the uplink signal US has not been received, a value that represents "reply to uplink signal is absent" is written. For the local ID regarding which the downlink signal DS in response to the uplink signal US has been received, a value that represents "pen-down state" is written. For the local ID regarding which the value of the writing pressure is 0, a value that represents "writing pressure=0" is additionally written, and for the local ID regarding which the value of the writing pressure is larger than 0, a value that represents "writing pressure>0" is additionally written.

Furthermore, the state detecting circuit 73 executes processing of, regarding each local ID, acquiring the operation state, acquiring reset command non-issuance flag 1, acquiring reset command non-issuance flag 2, and acquiring the deletion counter, and writing them to the ID management table 70. The details will be described more specifically later with reference to processing flowcharts of the sensor controller 31.

The transmitter circuit 62 is a circuit that generates the uplink signal US in accordance with control by the MCU 60 and the logic circuit 61. As depicted in FIG. 7, the transmitter circuit includes a pattern supply circuit 80, a switch 81, a code sequence holding circuit 82, a spreading processing circuit 83, and a transmission guard circuit 84. Particularly regarding the pattern supply circuit 80, description will be provided based on the assumption that it is included in the transmitter circuit 62 in the present embodiment. However, the pattern supply circuit 80 may be included in the MCU 60.

There are two types of uplink signal US, the stylus discovery signal and the command signal, as described above. Furthermore, the stylus discovery signal is composed of repetition of the predetermined detection pattern c1 and the predetermined delimiter pattern STP disposed at the tail end.

The detection pattern c1 is a pattern of the values of symbols used for detection of the existence of the sensor controller 31 by the stylus 2 and is made known to the stylus 2 in advance (before the stylus 2 detects the sensor controller 31). The symbol is the unit of information used for modulation in transmission processing (unit of information expressed by a transmission signal) and is the unit of information obtained by demodulating one symbol that is a received signal in reception processing. The symbol value can include a value converted to a bit sequence by the stylus 2 that has received the symbol (hereinafter referred to as "bit sequence corresponding value") and a value that is not converted to a bit sequence by the stylus 2 that has received the symbol (hereinafter referred to as "bit sequence non-corresponding value"). In a concrete example, the detection pattern c1 is formed of a pattern "PM" arising from coupling two types of bit sequence non-corresponding values "P" and "M."

The delimiter pattern STP is a pattern of the values of symbols used for notifying the stylus 2 of the end of the repetition period of the detection pattern c1 and is formed of a pattern that does not appear in the repetition of the detection pattern c1. The delimiter pattern STP is also made known to the stylus 2 in advance (before the stylus 2 detects the sensor controller 31). In one example, in the case of forming the detection pattern c1 by "PM," which is a coupling of two bit sequence non-corresponding values "P" and "M" as described above, the delimiter pattern STP can be formed of a pattern "PP" obtained by continuing the bit sequence non-corresponding value "P" twice. By switching the configurations of the delimiter pattern STP and the detection pattern c1, the delimiter pattern may be formed by "PM" and the detection pattern c1 may be formed by "PP."

The pattern supply circuit 80 holds the detection pattern c1 and the delimiter pattern STP and is configured to output them in predetermined order in accordance with an instruction of the control signal ctrl_t1 supplied from the logic circuit 61. Specifically, the pattern supply circuit 80 is configured to repeatedly output the detection pattern c1 continuously during a predetermined continuous transmission period and output the delimiter pattern STP immediately after the end of the continuous transmission period. This way, transmission of the stylus discovery signal is implemented.

The switch 81 has a function of selecting either one of the pattern supply circuit 80 and the MCU 60 based on the control signal ctrl_t2 supplied from the logic circuit 61, and supplying an output of the selected circuit to the spreading processing circuit 83. If the switch 81 selects the pattern supply circuit 80, the detection pattern c1 or the delimiter pattern STP is supplied from the pattern supply circuit 80 to the spreading processing circuit 83. On the other hand, if the switch 81 selects the MCU 60, the control information c2 is supplied from the MCU 60 to the spreading processing circuit 83.

The control information c2 is information including a setting instruction of a local ID or a transmission instruction of various types of data other than the local ID, as described above. The control information c2 is different from the detection pattern c1 and the delimiter pattern STP in that the value thereof is not shared with the stylus 2 in advance. The control information c2 is transmitted in such a manner as to be associated with the values (for example 0 to 15) of symbols associated with a bit sequence, for example.

The code sequence holding circuit 82 has a function of generating and holding a spreading code PN with a predetermined chip length having autocorrelation characteristics based on the control signal ctrl_t3 supplied from the logic circuit 61. The spreading code PN held by the code sequence holding circuit 82 is supplied to the spreading processing circuit 83.

The spreading processing circuit 83 has a function of obtaining a transmission chip sequence with a predetermined chip length by modulating the spreading code PN held by the code sequence holding circuit 82 based on the values of the symbols supplied through the switch 81 (detection pattern c1, delimiter pattern STP, or control information c2). The spreading processing circuit 83 is configured to supply the acquired transmission chip sequence to the transmission guard circuit 84.

The transmission guard circuit 84 has a function of inserting a guard period necessary for switching between transmission operation and reception operation (period during which neither transmission nor reception is carried out) between the transmission period of the uplink signal US and the reception period of the downlink signal DS based on the control signal ctrl_t4 supplied from the logic circuit 61.

The receiver circuit 63 is a circuit for receiving the downlink signal DS transmitted from the stylus 2 based on the control signal ctrl_r of the logic circuit 61. Specifically, the receiver circuit 63 is configured to include an amplification circuit 85, a detection circuit 86, and an analog-digital (AD) converter 87.

The amplification circuit 85 amplifies and outputs the downlink signal DS supplied from the selection circuit 64. The detection circuit 86 is a circuit that generates a voltage corresponding to the level of the output signal of the amplification circuit 85. The AD converter 87 is a circuit that generates a digital signal by sampling the voltage output from the detection circuit 86 at predetermined time intervals. The digital signal output by the AD converter 87 is supplied to the MCU 60. The MCU 60 acquires data (local ID, global ID, writing pressure, and so forth) transmitted from the stylus 2 based on the digital signal supplied in this manner.

The selection circuit 64 is configured to include switches 88x and 88y and conductor selection circuits 89x and 89y.

The switches 88x and 88y are each a one-circuit-two-contact switch element configured in such a manner that a common terminal is connected to either one of a T-terminal and an R-terminal. The common terminal of the switch 88x is connected to the conductor selection circuit 89x, the T-terminal is connected to the output terminal of the transmitter circuit 62, and the R-terminal is connected to the input terminal of the receiver circuit 63. Furthermore, the common terminal of the switch 88y is connected to the conductor selection circuit 89y and the T-terminal is connected to the output terminal of the transmitter circuit 62 and the R-terminal is connected to the input terminal of the receiver circuit 63.

The conductor selection circuit 89x is a switch element for selectively connecting the plural linear electrodes 30X to the common terminal of the switch 88x. The conductor selection circuit 89x is also capable of simultaneously connecting a portion or all of the plural linear electrodes 30X to the common terminal of the switch 88x.

The conductor selection circuit 89y is a switch element for selectively connecting the plural linear electrodes 30Y to the common terminal of the switch 88y. The conductor selection circuit 89y is also configured to be capable of simultaneously connecting part or all of the plural linear electrodes 30Y to the common terminal of the switch 88y.

To the selection circuit 64, four control signals sTRx, sTRy, selX, and selY are supplied from the logic circuit 61. Specifically, the control signals sTRx, sTRy, selX, and selY are supplied to the switch 88x, the switch 88y, the conductor selection circuit 89x, and the conductor selection circuit 89y, respectively. The logic circuit 61 implements transmission of the uplink signal US including the stylus discovery signal and the command signal and reception of the downlink signal DS including the burst signal and the data signal, by controlling the selection circuit 64 using these control signals sTRx, sTRy, selX, and selY.

More specifically, in the case of transmitting the stylus discovery signal, the logic circuit 61 controls the selection circuit 64 in such a manner that all of the plural linear electrodes 30Y (or all of the plural linear electrodes 30X) are connected to the output terminal of the transmitter circuit 62. Furthermore, in the case of transmitting the command signal, the logic circuit 61 controls the selection circuit 64 in such a manner that a predetermined number of electrodes that exist near a position derived the last time for the stylus 2, which is a transmission target, among the respective plural linear electrodes 30X and 30Y are connected to the output terminal of the transmitter circuit 62.

The logic circuit 61 in the case of receiving the burst signal controls the selection circuit 64 in such a manner that all of the respective plural linear electrodes 30X and 30Y are sequentially connected to the input terminal of the receiver circuit 63 while the transmission of the burst signal is continuing. This allows the MCU 60 to acquire the reception intensity of the burst signal at each of the respective plural linear electrodes 30X and 30Y and thus it becomes possible to derive the position of the stylus 2 as described above. On the other hand, the logic circuit 61 in the case of receiving the data signal controls the selection circuit 64 in such a manner that only one electrode closest to a position derived based on the immediately-previous burst signal of the stylus 2 that transmits the data signal, among the plural linear electrodes 30X and 30Y, is connected to the input terminal of the receiver circuit 63. This makes it possible to fully utilize the transmission time of the data signal for sending data from the stylus 2 to the sensor controller 31.

The configurations and operation of the stylus 2 and the electronic apparatus 3 that form the position detecting system 1 are described in detail above. Next, operation of the stylus 2 and the sensor controller 31 relating to the present disclosure will be described in more detail with reference to flowcharts of processing executed by the stylus 2 and the sensor controller 31.

FIG. 9 to FIG. 15 are flowcharts depicting processing flows of the sensor controller 31. Furthermore, FIG. 16 to FIG. 20 are flowcharts depicting processing flows of the stylus 2. Moreover, FIG. 21 to FIG. 24 and FIG. 26 to FIG. 29 are time charts depicting signals transmitted and received between one or two of the styluses 2a to 2c and the sensor controller 31. Furthermore, FIG. 25 is an explanatory diagram of cancellation of registration of a local ID by the sensor controller 31 and the stylus 2a. In the following, description will be made with reference to these diagrams.

Figure 9:
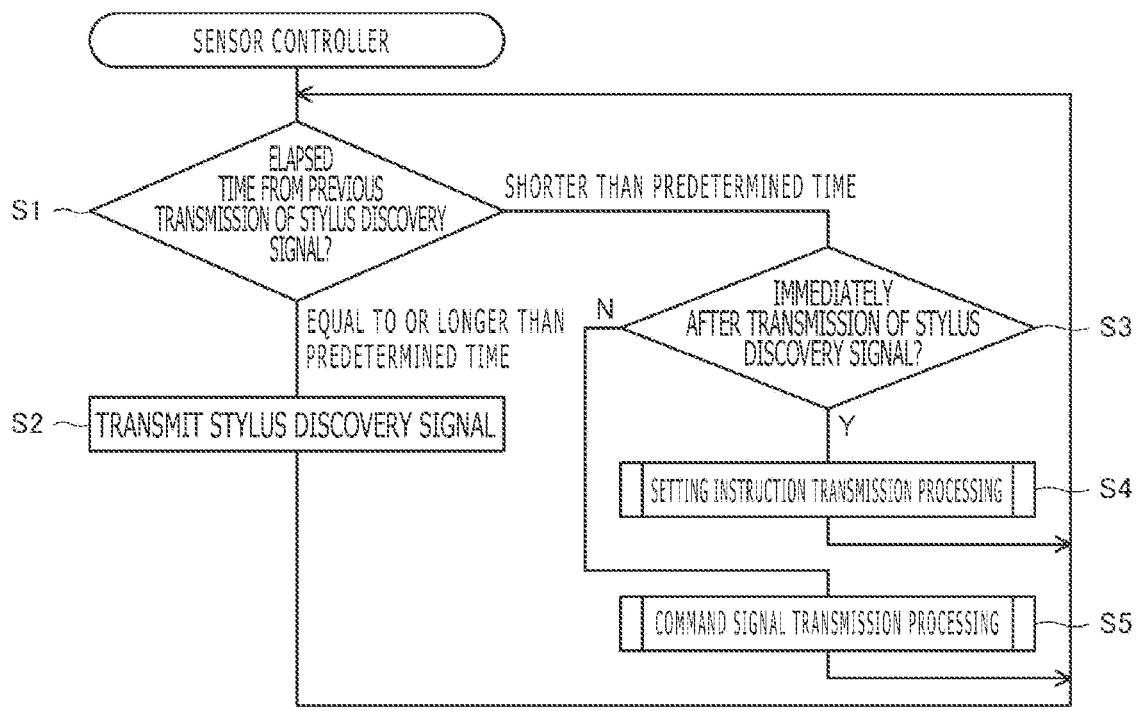
FIG. 9 is a flowchart depicting a processing flow of a sensor controller 31 depicted in FIG. 1.

First, as depicted in FIG. 9, the sensor controller 31 determines whether the elapsed time from the previous transmission of the stylus discovery signal is equal to or longer than a predetermined time or is shorter than the predetermined time (step S1). The sensor controller 31 needs to transmit the stylus discovery signal every predetermined time for detecting the stylus 2 that has not been detected, and determines whether or not the transmission timing of this stylus discovery signal has arrived, in step S1.

Figure 21:
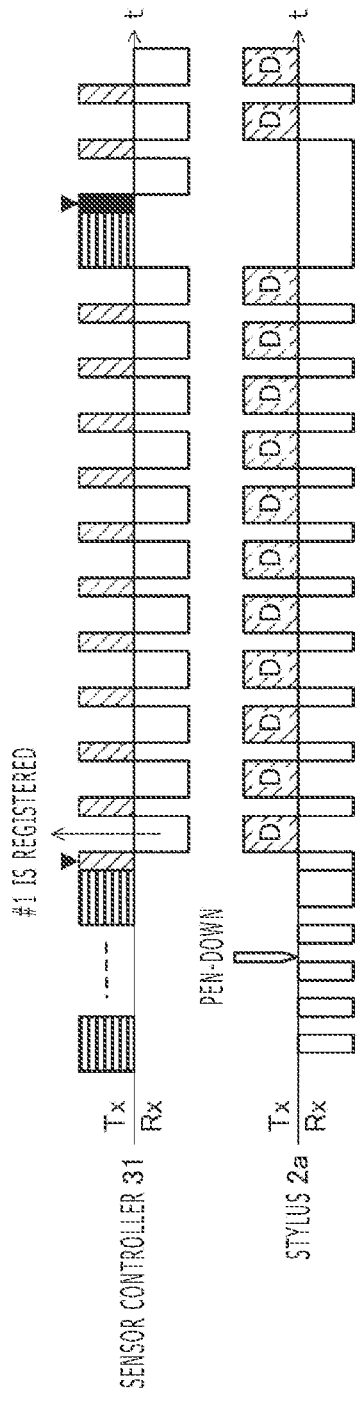
FIG. 21 is a time chart depicting signals transmitted and received between the stylus 2a and the sensor controller 31 depicted in FIG. 1 (a case in which the sensor controller 31 newly registers the stylus 2a).

If determining in step S1 that the elapsed time is equal to or longer than the predetermined time, the sensor controller 31 transmits the stylus discovery signal (step S2). In FIG. 21, the stylus discovery signal transmitted from the sensor controller 31 every predetermined time in this manner is illustrated. After transmitting the stylus discovery signal, the sensor controller 31 returns the processing to step S1.

If it is determined in step S1 that the elapsed time is shorter than the predetermined time, the sensor controller 31 determines whether or not the present timing is immediately after transmission of the stylus discovery signal (step S3). As a result, the sensor controller 31 executes "setting instruction transmission processing" if determining that the present timing is immediately after transmission (step S4), and executes "command signal transmission processing" if determining that the present timing is not immediately after transmission (step S5). If information of the setting instruction command can be included in the stylus discovery signal, step S4 and step S5 may be one processing.

In FIG. 10, details of the setting instruction transmission processing are depicted. As depicted in this diagram, at first, the sensor controller 31 that has started the setting instruction transmission processing determines a local ID # n of the setting target based on the registration status of the local ID (step S10). The check of the registration status of the local ID is carried out by referring to the ID management table 70 depicted in FIG. 8. Subsequently, the sensor controller 31 transmits a command signal that represents a setting instruction for the determined local ID # n (step S11). As depicted in FIG. 21, this command signal is continuously transmitted after the transmission of the stylus discovery signal.

Next, the sensor controller 31 carries out reception operation of the downlink signal DS (step S12) and determines whether or not the downlink signal DS including the local ID # n has been received (step S13). In this case, the sensor controller 31 decodes a data signal in the downlink signal DS to check whether or not the downlink signal DS includes the local ID # n. This operation is the same in reception determination in other steps, to be described later.

If determining in step S13 that the downlink signal DS including the local ID # n has not been received, the sensor controller 31 ends the setting instruction transmission processing without executing further specific processing and returns to step S1 in FIG. 9.

On the other hand, if determining in step S13 that the downlink signal DS including the local ID # n has been received, only at one position in the panel surface, the sensor controller 31 registers the local ID # n in the ID management table 70 (step S14).

In FIG. 21, a case in which the sensor controller 31 newly registers the stylus 2a is depicted. The initial state of this diagram is the state in which no local ID is registered in the ID management table 70. The stylus 2a that has received the stylus discovery signal at pen-down subsequently receives a command signal that represents a setting instruction of a local ID #1. Then, the stylus 2a transmits the downlink signal DS including the local ID #1 in response to this command signal. In response to receiving this downlink signal DS, the sensor controller 31 registers the local ID #1 in the ID management table 70.

Figure 22:
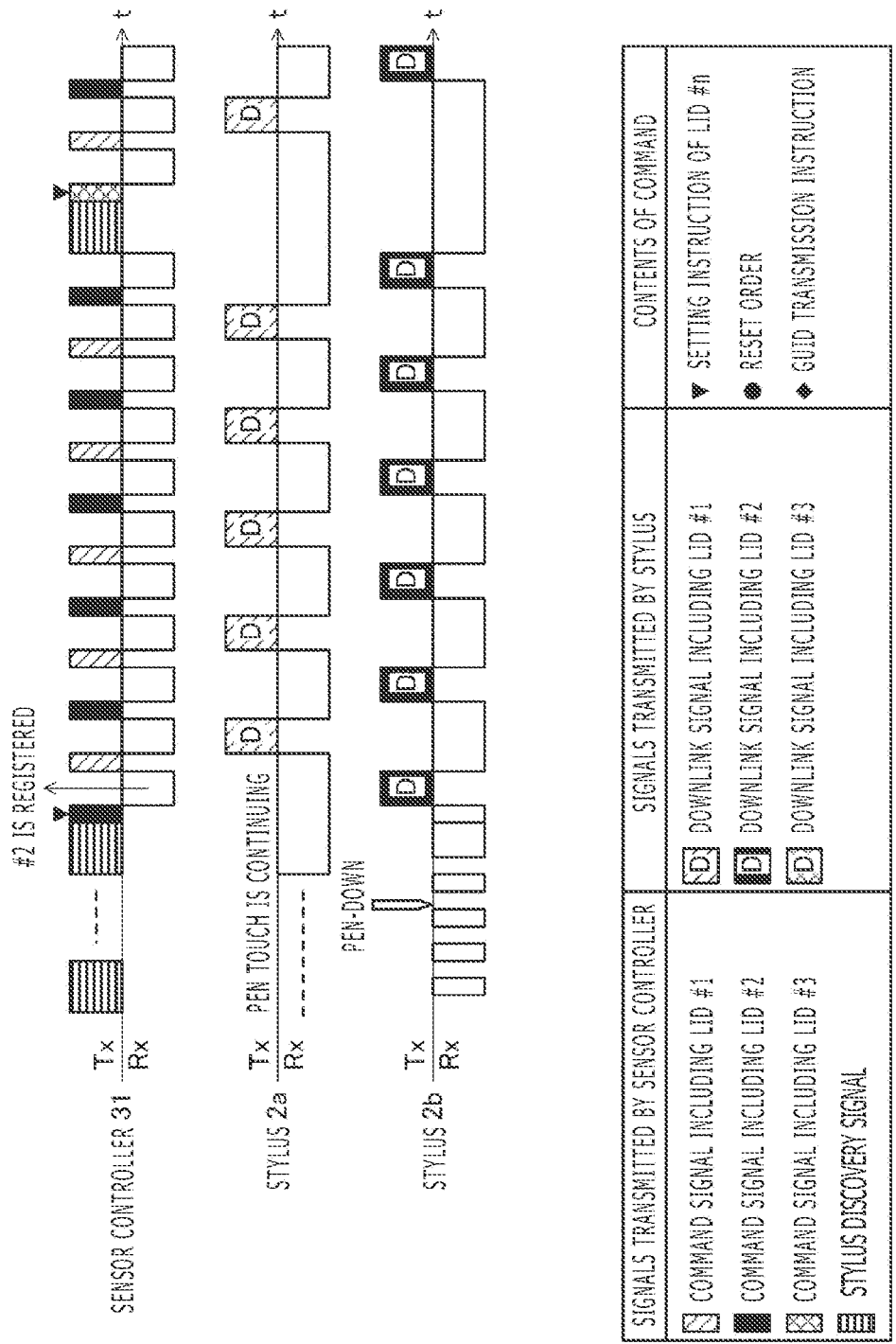
FIG. 22 is a time chart depicting signals transmitted and received between the styluses 2a and 2b and the sensor controller 31 depicted in FIG. 1 (a case in which the sensor controller 31 additionally registers the stylus 2b after registering the stylus 2a).

FIG. 22 depicts a case in which the sensor controller 31 registers the stylus 2a and thereafter additionally registers the stylus 2b. The initial state of this diagram is the state in which the stylus 2a has been registered in FIG. 21 (state in which the local ID #1 has been allocated to the stylus 2a). Because the local ID #1 has been already registered in the ID management table 70, the command signal transmitted by the sensor controller 31 subsequently to the stylus discovery signal is a command signal that represents a setting instruction of a local ID #2. The stylus 2b that has received the stylus discovery signal at pen-down subsequently receives the command signal that represents the setting instruction of the local ID #2. Then, the stylus 2a transmits the downlink signal DS including the local ID #2 in response to this command signal. In response to receiving this downlink signal DS, the sensor controller 31 registers the local ID #2 in the ID management table 70.

Referring back to FIG. 10, the sensor controller 31 that has registered the local ID # n in the ID management table 70 in step S14 derives the position of the stylus 2 based on a burst signal in the received downlink signal DS (step S15). Furthermore, if a data signal in the downlink signal DS includes data other than the local ID # n, the sensor controller 31 extracts the data (step S16).

Moreover, in order to give opportunities for transmission of the downlink signal DS to the stylus 2 corresponding to the newly-registered local ID # n, the sensor controller 31 readjusts the transmission schedule of the downlink signal DS and updates the ID management table 70 based on the result thereof (step S17).

Referring to FIG. 21 and FIG. 22 again, in the state of FIG. 21 in which only the local ID #1 is registered, all command signals excluding the command signal immediately after the stylus discovery signal are signals addressed to the local ID #1 (stylus 2a). That is, the scan rate of the stylus 2a is set to 1.

When the local ID #2 is newly registered as depicted in FIG. 22, the sensor controller 31 needs to give opportunities for transmission of the downlink signal DS also to the local ID #2 (stylus 2b). Therefore, in the example of FIG. 22, the local ID #1 and the local ID #2 are given the scan rate of the same value (=1/2) to allow the styluses 2a and 2b to alternately transmit the downlink signal DS. As above, by default (state before the scan rates are determined based on the global ID or the movement velocity of the stylus 2), the sensor controller 31 determines the scan rate for each of one or more styluses that have been detected in such a manner that the scan rates of the respective one of the one or more styluses that have been detected are equal to each other.

The readjustment of the transmission schedule in step S17 in FIG. 10 is carried out in order to give opportunities for transmission of the downlink signal DS to the newly-registered stylus 2, as in this example depicted in FIG. 22. After the end of step S17, the sensor controller 31 ends the setting instruction transmission processing and returns to step S1 in FIG. 9.

If determining in step S13 that the downlink signal DS including the local ID # n has been received at plural positions in the panel surface, the sensor controller 31 sets the value of the operation state of the local ID # n to "first reset mode" in the ID management table 70 (step S18) and sets the reset command non-issuance flag 1 of the local ID # n to be "TRUE" (step S19). The first reset mode is an operation mode for temporarily cancelling allocation of the local ID # n immediately after transmission of a command signal that represents a setting instruction of the local ID # n as exemplified in FIG. 26. Reset command non-issuance flag 1 is binary flag information that becomes "TRUE" when the reset order that should be transmitted in the first reset mode has not yet been transmitted and becomes "FALSE" in the other case. Detailed contents of reset processing in which they are used will be described later with reference to FIG. 13 and FIG. 14. After the end of step S19, the sensor controller 31 ends the setting instruction transmission processing and returns to step S1 in FIG. 9.

Next, in FIG. 11, details of the command signal transmission processing are depicted. As depicted in this diagram, first the sensor controller 31 that has started the command signal transmission processing determines (selects) a local ID # k as the transmission target of a command signal based on the transmission schedule of each local ID registered in the ID management table 70 (step S20). Specifically, the sensor controller 31 determines (selects) the local ID # k as the transmission target of a command signal based on the scan rate that has been already determined regarding each local ID. Then, by referring to the value of the operation state in the ID management table 70 again, the sensor controller 31 determines the value of the operation state of the local ID # k to be one of "normal mode," "first reset mode," or "second reset mode" (step S21).

Figure 12:
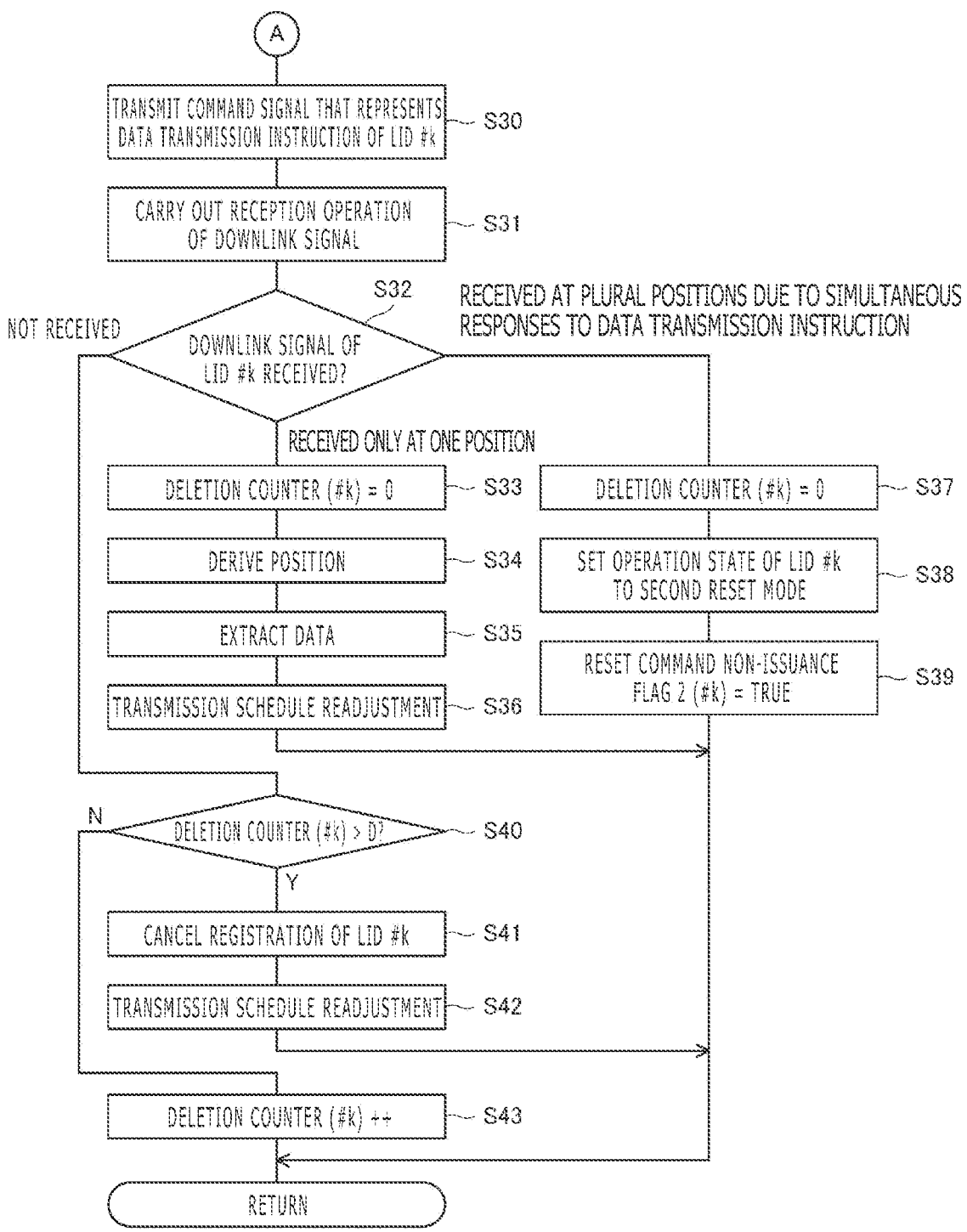
FIG. 12 is a flowchart depicting the detailed flow of the command signal transmission processing depicted in FIG. 9.

In FIG. 12, processing in the case in which the sensor controller 31 has determined in step S21 that the operation state of the local ID # k is the "normal mode" is depicted. As depicted in this diagram, first the sensor controller 31 in this case transmits a command signal that represents a data transmission instruction to the stylus 2 identified based on the local ID # k (step S30). The data instructed to be transmitted here is, for example, data that represents the operation state at the timing when the command signal that represents the data transmission instruction is received, such as data that represents the on-/off-state of the switch 22 depicted in FIG. 2, data that represents the writing pressure detected by the writing pressure detecting sensor 23 depicted in FIG. 2, data that represents the measurement result of the six-axis IMU 50 depicted in FIG. 3, and a global ID stored in the global ID storing circuit 51 depicted in FIG. 3, and so forth.

The sensor controller 31 that has transmitted the command signal in step S30 subsequently carries out reception operation of the downlink signal DS (step S31) and determines whether or not the downlink signal DS including the local ID # k has been received (step S32).

If determining in step S32 that the downlink signal DS including the local ID # k has been received only at one position in the panel surface, first the sensor controller 31 sets 0 in the deletion counter of the local ID # k in the ID management table 70 (step S33). The deletion counter is a counter that represents the number of times reception of the downlink signal DS has been tried but failed for each local ID. The deletion counter is reset to 0 when the downlink signal DS including the corresponding local ID # k is received. If the deletion counter of the local ID # k is 0, registration of the local ID # k is not canceled.

Next, the sensor controller 31 derives the position of the stylus 2 based on a burst signal in the received downlink signal DS (step S34) and extracts data included in a data signal in the downlink signal DS (step S35). Moreover, the sensor controller 31 readjusts the transmission schedule (step S36).

Figure 23:
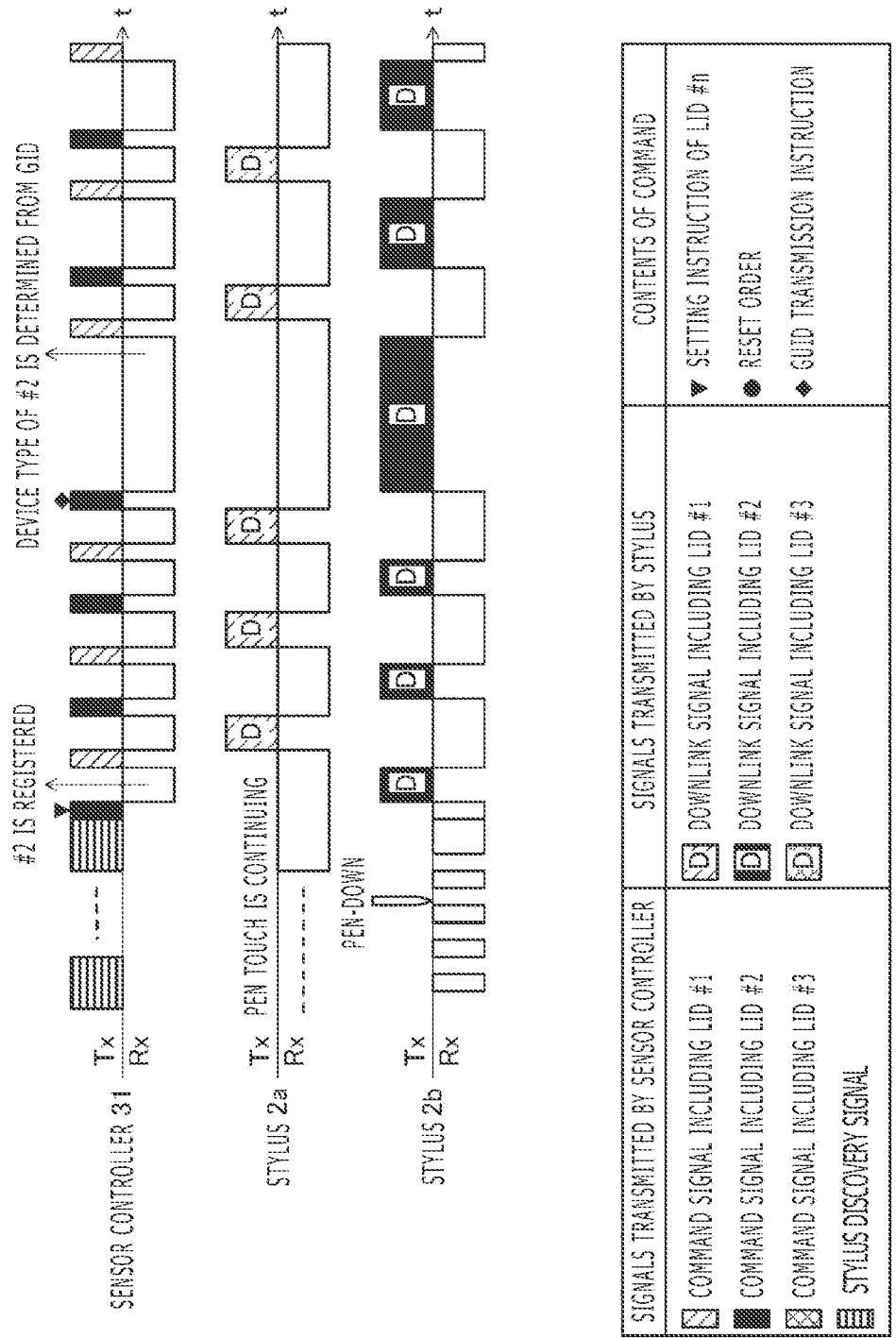
FIG. 23 is a time chart depicting signals transmitted and received between the styluses 2a and 2b and the sensor controller 31 depicted in FIG. 1 (a case in which the sensor controller 31 readjusts the transmission schedule based on the device type of each of the styluses 2a and 2b).

In FIG. 23, one example of the readjustment of the transmission schedule carried out in step S36 is depicted. In this example, the styluses 2a and 2b simultaneously exist on the panel surface and the local IDs #1 and #2 are given to the styluses 2a and 2b, respectively. Furthermore, the continuous transmission time of the downlink signal DS by the stylus 2b (local ID #2) is set to two times the default value. The sensor controller 31 receives a global ID from the stylus 2b and determines the device type of the stylus 2b based on the received global ID. Then, from the determination result, the sensor controller 31 understands that the continuous transmission time of the downlink signal DS by the stylus 2b is two times the default value. Based on the fact understood in this manner, the sensor controller 31 determines the transmission schedule of the downlink signal DS of each local ID in such a manner that the continuous transmission time of the downlink signal DS by the stylus 2b becomes two times the default value, and sets the transmission schedule in the ID management table 70. Then, from then on, the sensor controller 31 controls the transmission interval of the command signal in such a manner that the continuous reception operation time in the case of receiving the downlink signal DS from the stylus 2b becomes two times the default value.

Here, in FIG. 23, the continuous reception operation time of the sensor controller 31 when the global ID is received is longer than usual. This is because the global ID is a large-size data having 64 bits, as described above. In order to receive the global ID, which is a large data, the sensor controller 31 extends the continuous reception operation time after transmission of a command signal that represents a transmission instruction of the global ID according to the size of the global ID. The adjustment of this continuous reception operation time is operation carried out separately from the readjustment of the transmission schedule.

Figure 24:
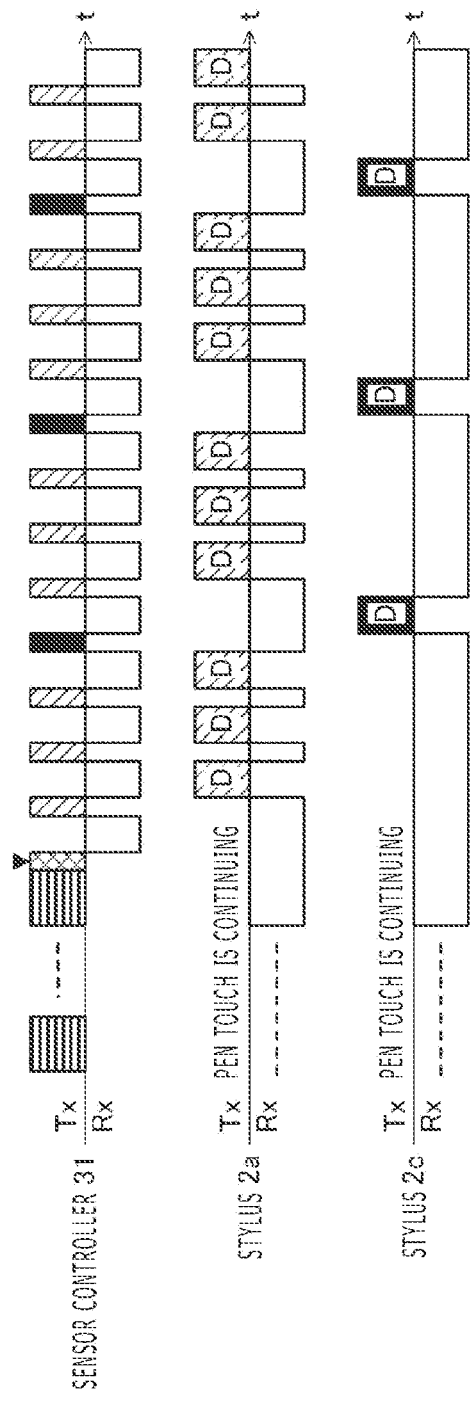
FIG. 24 is a time chart depicting signals transmitted and received between the styluses 2a and 2b and the sensor controller 31 depicted in FIG. 1 (a case in which writing by the styluses 2a and 2c is carried out after the sensor controller 31 has readjusted the transmission schedule based on the device type of each of the styluses 2a and 2c).
Figure 25:
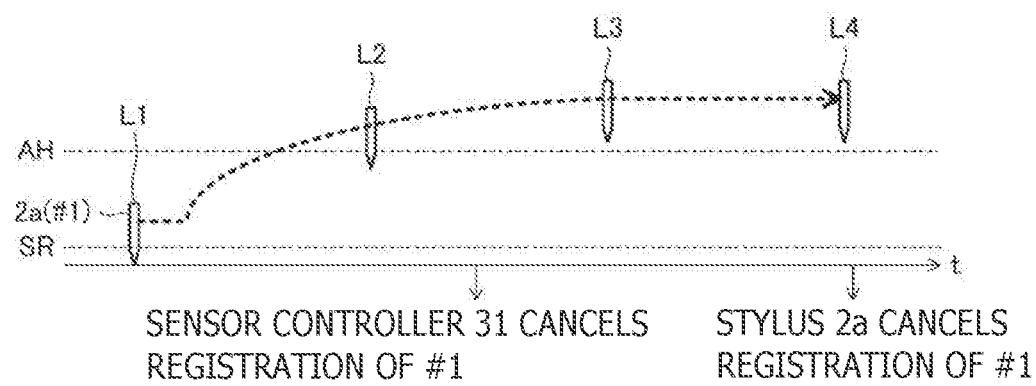
FIG. 25 is an explanatory diagram of cancellation of registration of a local ID by the sensor controller 31 and the stylus 2a depicted in FIG. 1.

In FIG. 24, another example of the readjustment of the transmission schedule carried out in step S36 is depicted. In this example, the styluses 2a and 2b simultaneously exist on the panel surface and the local IDs #1 and #2 are given to the styluses 2a and 2c, respectively. The sensor controller 31 receives a global ID from each of the styluses 2a and 2c (not depicted) and thereby understands the fact that the stylus 2a is a pen-type device and the stylus 2c is a ruler-type device. Based on the fact understood in this manner, the sensor controller 31 determines the transmission schedule of the downlink signal DS of each local ID in such a manner that the scan rate of the stylus 2a becomes three times the scan rate of the stylus 2c, and sets the transmission schedule in the ID management table 70. Then, from then on, the sensor controller 31 controls the transmission frequency of the command signal addressed to each local ID in such a manner that the scan rate of the stylus 2a becomes three times the scan rate of the stylus 2c.

Referring back to FIG. 12, the sensor controller 31 that has readjusted the transmission schedule in step S36 ends the command signal transmission processing and returns to step S1 in FIG. 9.

On the other hand, if determining in step S32 in FIG. 12 that the downlink signal DS including the local ID # k has been received at plural positions in the panel surface, the sensor controller 31 sets 0 in the deletion counter of the local ID # k in the ID management table 70 (step S37). Furthermore, in the ID management table 70 likewise, the sensor controller 31 sets the value of the operation state of the local ID # k to "second reset mode" (step S38) and sets "TRUE" in the reset command non-issuance flag 2 for the local ID # k (step S39). The second reset mode is the same as the first reset mode set in step S18 depicted in FIG. 10 in that the second reset mode is an operation mode for cancelling allocation of the local ID # k. However, the second reset mode is different from the first reset mode in that the second reset mode is an operation mode for cancelling allocation of the local ID # n with priority if the signal is received at plural positions (i.e., in case of overlapping detection) when command signals that represent (not a setting instruction but) a data transmission instruction are being transmitted to the local ID # n, as exemplified in FIG. 27. Reset command non-issuance flag 2 is binary flag information that becomes "TRUE" when the reset order that should be transmitted in the second reset mode has not yet been transmitted and becomes "FALSE" in the other case. Detailed contents of the reset processing in which they are used will be described later with reference to FIG. 15. After the end of step S39, the sensor controller 31 ends the command signal transmission processing and returns to step S1 in FIG. 9.

The sensor controller 31 in the case of determining in step S32 in FIG. 12 that the downlink signal DS including the local ID # k has not been received determines whether or not the deletion counter of the local ID # k stored in the ID management table 70 is larger than a predetermined threshold D (step S40). If determining that the deletion counter is not larger, the sensor controller 31 increments the deletion counter of the local ID # k by 1 (step S43). On the other hand, if determining that the deletion counter is larger, the sensor controller 31 cancels the registration of the local ID # k by deleting the row of the local ID # k from the ID management table 70 (step S41). Then, in order to allocate opportunities for transmission of the downlink signal DS previously given to the stylus 2 corresponding to the local ID # k to other styluses 2, the sensor controller 31 readjusts the transmission schedule of the downlink signal DS and updates the ID management table 70 based on the result thereof (step S42).

The determination of step S40 is, in short, processing of determining whether or not the state in which a response to the command signal from the stylus 2 corresponding to the local ID # k is absent has continued a larger number of times than D times. If the state in which the response is absent continues, the possibility that the stylus 2 has left the sensing range SR depicted in FIG. 1 is thought to be high. Therefore, the sensor controller 31 cancels the registration of the local ID # k in this case. The sensor controller 31 that has ended the processing of step S42 or step S43 ends the command signal transmission processing and returns to step S1 in FIG. 9.

FIG. 25 is an explanatory diagram of cancellation of registration of a local ID by the sensor controller 31 and the stylus 2a. In this diagram, an example of the case is depicted in which the stylus 2a to which the local ID #1 is allocated is in contact with the panel surface at first (L1) and moves therefrom to the outside of the sensing range SR (L2) and further moves to a height surpassing the uplink detection height AH (L3, L4). By the processing of the above-described steps S40 to S43, the sensor controller 31 cancels the registration of the local ID #1 allocated to the stylus 2a when a predetermined time (time corresponding to the above-described threshold D) elapses after the stylus 2a moves to the outside of the sensing range SR. In contrast, the stylus 2 can receive the uplink signal US if the stylus 2 does not exceed the uplink detection height AH even when being outside the sensing range SR. Thus, the stylus 2 does not cancel the registration of the local ID # k if its own height does not surpass the uplink detection height AH. The cancellation of the registration of the local ID #1 by the stylus 2a is carried out after a predetermined time elapses after reception of the uplink signal US becomes impossible, as explained in FIG. 17 to be described later.

Figure 13:
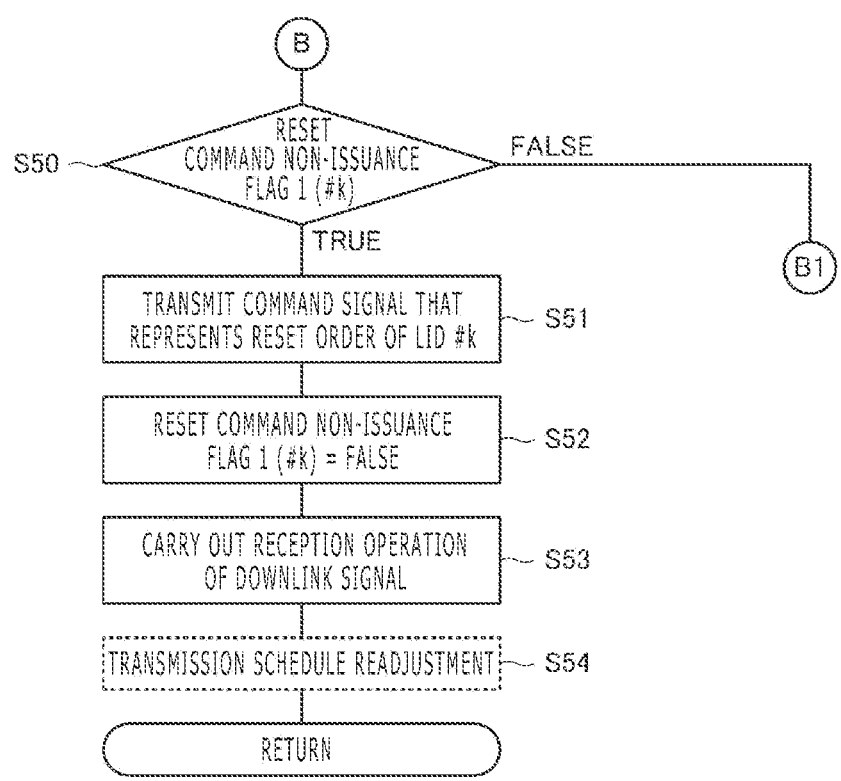
FIG. 13 is a flowchart depicting the detailed flow of the command signal transmission processing depicted in FIG. 9.
Figure 14:
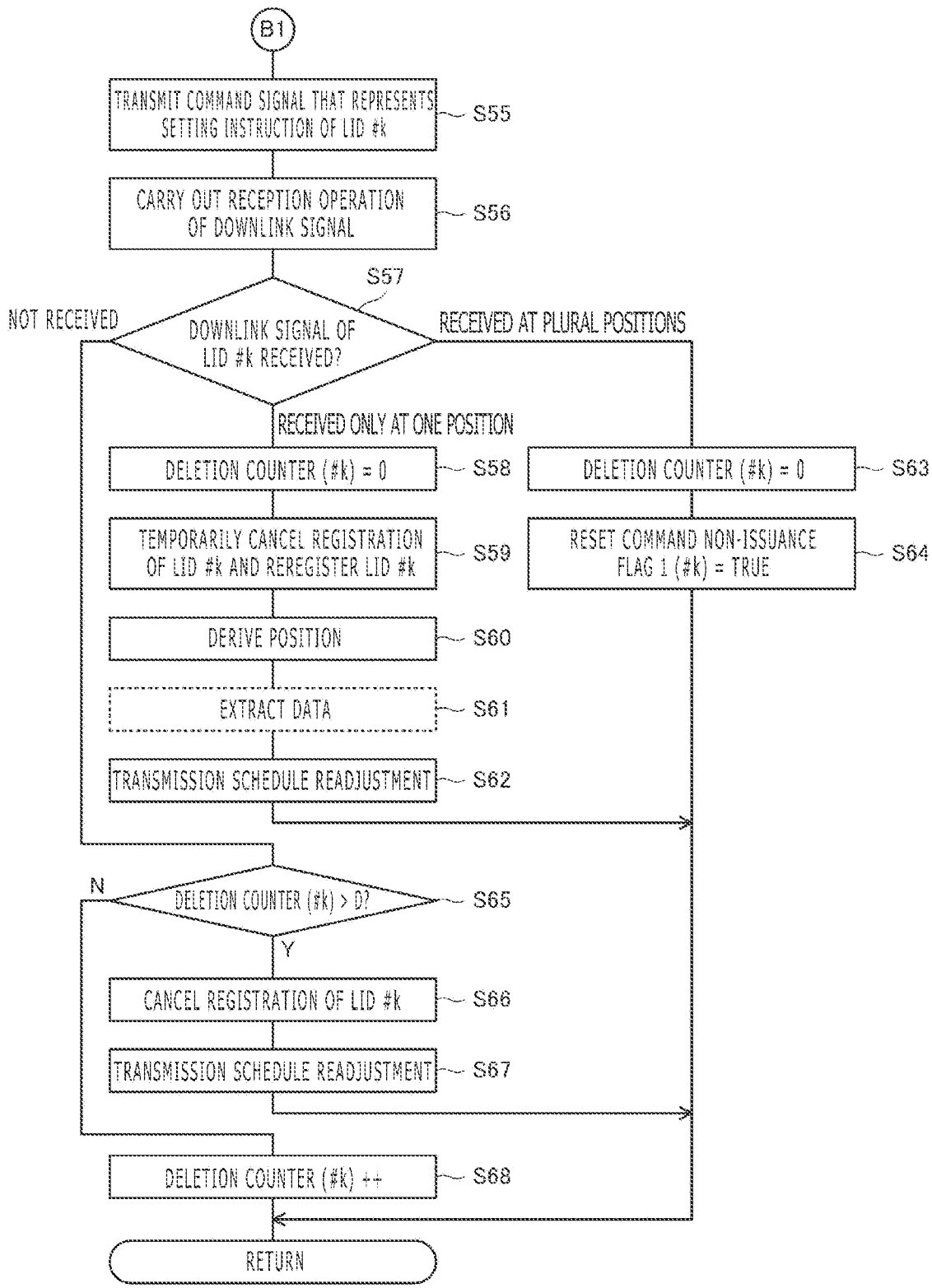
FIG. 14 is a flowchart depicting the detailed flow of the command signal transmission processing depicted in FIG. 9.

Next, in FIG. 13 and FIG. 14, processing is depicted in the case in which the value of the operation state of the local ID # k has been determined as the "first reset mode" in step S21 in FIG. 11. As depicted in FIG. 13, at first, the sensor controller 31 in this case determines the value of reset command non-issuance flag 1 of the local ID # k by referring to the ID management table 70 (step S50). If reset command non-issuance flag 1 of the local ID # k is "TRUE", the sensor controller 31 transmits a command signal that represents a reset order of the local ID # k (step S51). The stylus 2 that has received this command signal deletes the local ID # k stored in its memory 45 (see FIG. 2). Thereafter, the sensor controller 31 sets "FALSE" in reset command non-issuance flag 1 of the local ID # k (step S52) and subsequently carries out reception operation of the downlink signal DS (step S53). In this step S53, even if the downlink signal DS including the local ID # k is received, the sensor controller 31 does not carry out operation based on the signal. However, the sensor controller 31 may carry out operation of determining the local ID in the downlink signal DS. If the local ID is a local ID other than the local ID # k, the sensor controller 31 may further carry out operation based on the downlink signal DS (operation depicted in step S34 to step S36 in FIG. 12).

After step S53, the sensor controller 31 may readjust the transmission schedule (step S54). This readjustment may be processing of returning, to default values, the scan rate and the continuous transmission time of the downlink signal DS allocated to the local ID # k regarding which the reset order has been issued.

If determining in step S50 that reset command non-issuance flag 1 of the local ID # k is "FALSE," as depicted in FIG. 14, first the sensor controller 31 transmits a command signal that represents a setting instruction of the local ID # k (step S55). This is, in short, processing in the next opportunity for transmission of the command signal relating to the local ID # k after the transmission of the command signal that represents the reset order of the local ID # k in step S51. After transmitting the command signal, the sensor controller 31 carries out reception operation of the downlink signal DS (step S56) and determines whether or not the downlink signal DS including the local ID # k has been received (step S57).

If determining in step S57 that the downlink signal DS including the local ID # k has been received only at one position in the panel surface, first the sensor controller 31 sets 0 in the deletion counter of the local ID # k in the ID management table 70 (step S58). Next, the sensor controller 31 executes processing of temporarily cancelling the registration of the local ID # k in the ID management table 70 and reregistering the local ID # k in the ID management table 70 (step S59). Because the registration is temporarily canceled, the value of the operation state of the local ID # k (see FIG. 8) returns to the "normal mode" here. Then, the sensor controller 31 derives the position of the stylus 2 based on a burst signal in the received downlink signal DS (step S60). In addition, if a data signal in the downlink signal DS includes data other than the local ID # k, the sensor controller 31 extracts the data (step S61). Thereafter, the sensor controller 31 readjusts the transmission schedule similarly to step S17 (step S62). After the end of this step S62, the sensor controller 31 ends the command signal transmission processing and returns to step S1 in FIG. 9.

Figure 26:
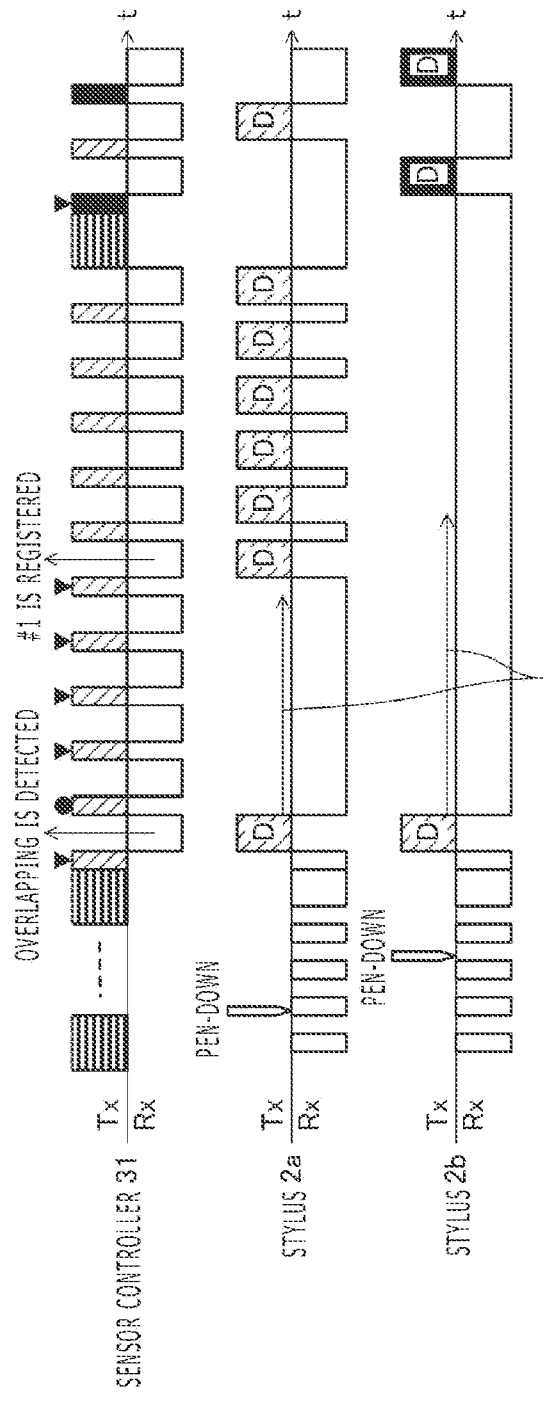
FIG. 26 is a time chart depicting signals transmitted and received between the styluses 2a and 2b and the sensor controller 31 depicted in FIG. 1 (a case in which the styluses 2a and 2b simultaneously respond to one setting instruction).

In FIG. 26, one example of operation of the sensor controller 31 and the stylus 2 relating to the first reset mode is depicted. In this example, both the styluses 2a and 2b simultaneously respond to a setting instruction of the local ID #1 transmitted from the sensor controller 31. Such a situation possibly occurs when both the styluses 2a and 2b become the pen-down state during the transmission interval of the stylus discovery signal, also as depicted in FIG. 26. When detecting reception of the downlink signal DS including the local ID #1 at plural positions ("overlapping is detected" in FIG. 26; in the flowchart, step S13 in FIG. 10), the sensor controller 31 transmits a command signal that represents a reset order of the local ID #1 (in the flowchart, step S51 in FIG. 13). Thereafter, the sensor controller 31 transmits a command signal that represents a setting instruction of the local ID #1 plural times (in the flowchart, step S55 in FIG. 14).

Although details of operation of the stylus 2 will be described later, after receiving this command signal that represents the reset order of the local ID #1, the styluses 2a and 2b each cancel the registration of the local ID #1 and generate the value of an ID setting wait counter, so as to ignore subsequently-received setting instructions for a time according to the value. After this ignorance period ends, the stylus 2 that has received a command signal that represents a setting instruction of the local ID #1 transmitted by the sensor controller 31 (stylus 2a in FIG. 26) transmits the downlink signal DS including the local ID #1 and thereby the local ID #1 is registered anew in the ID management table 70 ("#1 is registered" in FIG. 26; in the flowchart, step S59 in FIG. 14). As above, according to the processing of the sensor controller 31 and the stylus 2 in accordance with the present embodiment, even if a response is returned from plural styluses 2 to a setting instruction transmitted immediately after transmission of the stylus discovery signal, a local ID can be rapidly reallocated to only one of them. The stylus 2b, to which the local ID #1 is not allocated, receives a command signal that represents a setting instruction of the local ID #2 transmitted immediately after the next stylus discovery signal and starts communication with the sensor controller 31 using the local ID #2, also as depicted in FIG. 26.

Referring back to FIG. 14, if determining in step S57 that the downlink signal DS including the local ID # k has been received at plural positions in the panel surface, the sensor controller 31 sets 0 in the deletion counter of the local ID # k in the ID management table 70 (step S63) and sets "TRUE" in reset command non-issuance flag 1 of the local ID # k again (step S64). Thereafter, the sensor controller 31 ends the command signal transmission processing and returns to step S1 in FIG. 9. This is processing in the case in which the values of the above-described ID setting wait counters accidentally coincide with each other. Because the reset command non-issuance flag 1 of the local ID # k is set to "TRUE" again in step S64, the processing is executed again from the transmission of a command signal that represents a reset order (step S51 in FIG. 13).

The sensor controller 31 in the case of determining in step S57 that the downlink signal DS including the local ID # k has not been received determines whether or not the deletion counter (see FIG. 8) of the local ID # k is larger than the predetermined threshold D (step S65). If determining that the deletion counter is not larger, the sensor controller 31 increments the deletion counter of the local ID # k by 1 (step S68). On the other hand, if determining that the deletion counter is larger, the sensor controller 31 cancels the registration of the local ID # k by deleting the row of the local ID # k from the ID management table 70 (step S66). Then, in order to allocate opportunities for transmission of the downlink signal DS previously given to the stylus 2 corresponding to the local ID # k to other styluses 2, the sensor controller 31 readjusts the transmission schedule of the downlink signal DS and updates the ID management table 70 based on the result thereof (step S67). For example, in the example of FIG. 26, the processing of the steps S65 to S68 is executed if both the styluses 2a and 2b get out of the sensing range SR while the sensor controller 31 is transmitting the command signals that represent the setting instruction of the local ID #1.

Figure 15:
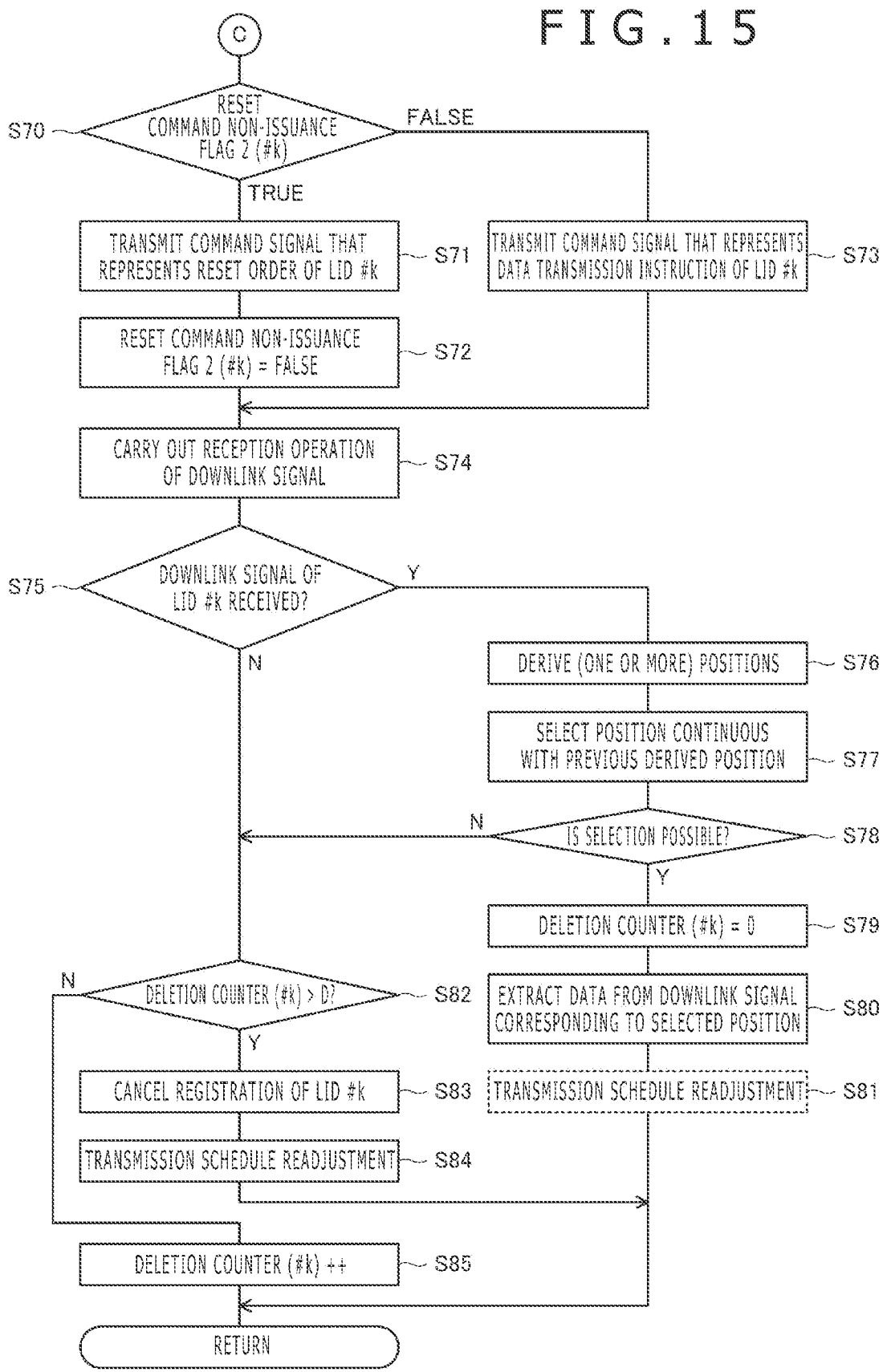
FIG. 15 is a flowchart depicting the detailed flow of the command signal transmission processing depicted in FIG. 9.

Next, FIG. 15 depicts processing in the case in which the value of the operation state of the local ID # k has been determined as the "second reset mode" in step S21 in FIG. 11.

Figure 27:
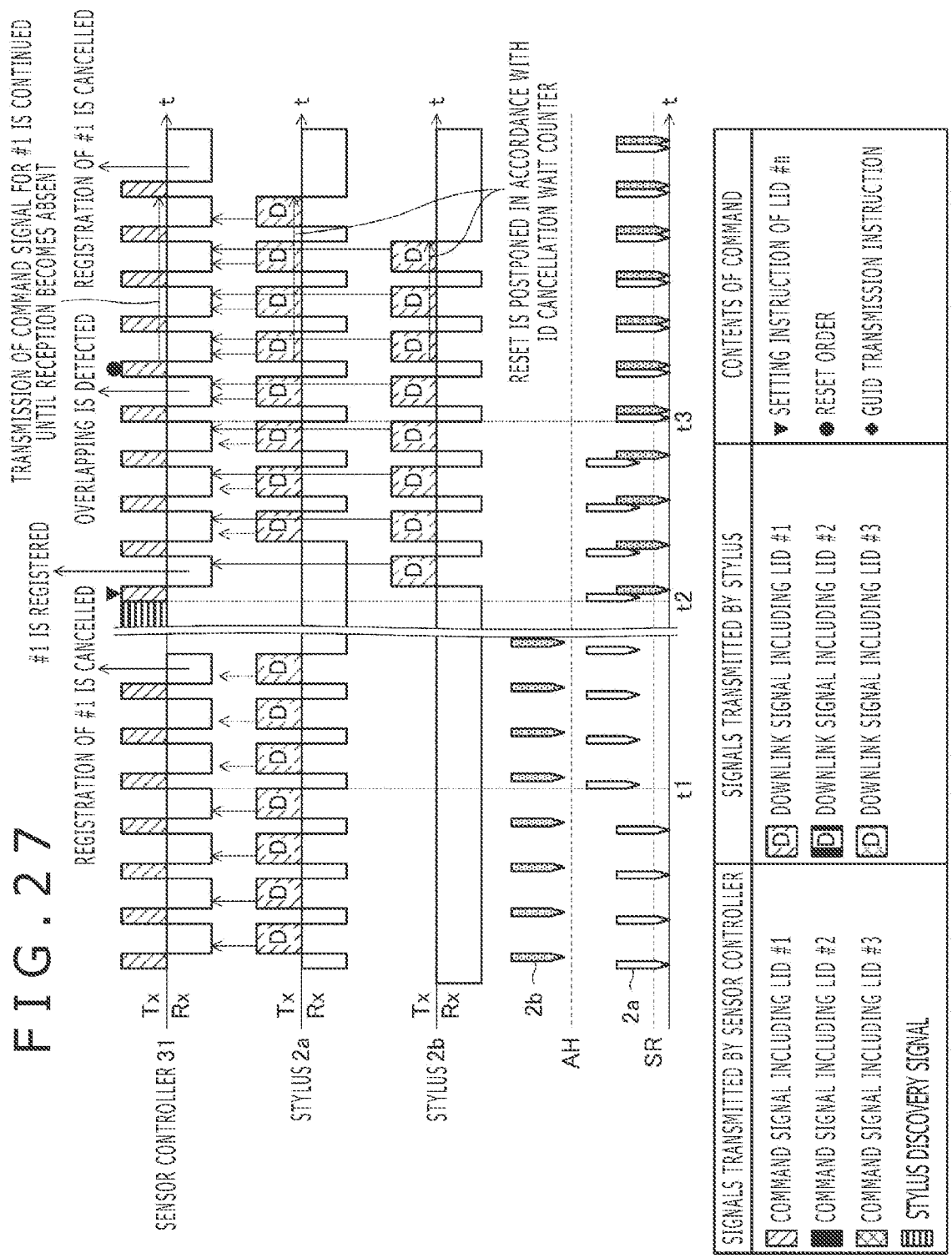
FIG. 27 is a time chart depicting signals transmitted and received between the styluses 2a and 2b and the sensor controller 31 depicted in FIG. 1 (a case in which the styluses 2a and 2b having the same local ID simultaneously respond to one data transmission instruction) and the state of the styluses 2a and 2b.

Here, processing of the sensor controller 31 and the stylus 2 in the second reset mode will be described in detail first with reference to FIG. 27.

As described with reference to FIG. 12, it is when two or more styluses 2 simultaneously transmit the downlink signal DS including the local ID # k in response to not a command signal that represents a setting instruction about the local ID # k but a command signal that represents a data transmission instruction of the local ID # k that the value of the operation state of the certain local ID # k is set to the second reset mode. In FIG. 27, one example of the case in which such a state occurs is depicted. In the example of this diagram, as the initial state, the local ID #1 is allocated to only the stylus 2a and a local ID is not allocated to the stylus 2b. When the stylus 2a gets out of the sensing range SR (clock time t1) in this situation, the downlink signal DS from the stylus 2a becomes unreachable and thus the sensor controller 31 cancels the registration of the local ID #1 after a predetermined time. However, as described with reference to FIG. 25, cancellation of the registration of the local ID in the stylus 2 is carried out later than in the sensor controller 31. Therefore, in the example of FIG. 27, cancellation of the registration of the local ID in the stylus 2 has not been carried out even after the sensor controller 31 has canceled the registration of the local ID #1.

Even in the state in which the stylus 2a remains holding the local ID #1, when the stylus 2b newly enters the sensing range SR (clock time t2), the stylus 2b receives a command signal that is transmitted by the sensor controller 31 and that represents a setting instruction of the local ID #1 and, as a result, the sensor controller 31 allocates the local ID #1 to the stylus 2b. Thereafter, when the stylus 2a that remains holding the local ID #1 enters the sensing range SR again (clock time t3), both the styluses 2a and 2b respond to a command signal that is addressed to the local ID #1 and represents a data transmission instruction. This is the case in which the determination of "received at plural positions" is made in step S32 depicted in FIG. 12. In FIG. 15, processing for eliminating such overlapping of the local ID #1 (state in which plural styluses 2 hold the same local ID # k) is described.

Referring back to FIG. 15, the sensor controller 31 in this case determines the value of reset command non-issuance flag 2 of the local ID # k at first (step S70). If reset command non-issuance flag 2 of the local ID # k is "TRUE", the sensor controller 31 transmits a command signal that represents a reset order of the local ID # k (step S71) and sets "FALSE" in reset command non-issuance flag 2 of the local ID # k in the ID management table 70 (step S72). These steps are processing executed immediately after the sensor controller 31 detects overlapping of the local ID # k. In FIG. 27, the reset order immediately after "overlapping is detected" is equivalent to the reset order transmitted in step S71. On the other hand, if determining in step S70 that reset command non-issuance flag 2 of the local ID # k is "FALSE," the sensor controller 31 transmits a command signal that represents a data transmission instruction of the local ID # k (step S73).

After the end of step S72 or step S73, the sensor controller 31 carries out reception operation of the downlink signal DS (step S74). Then, the sensor controller 31 determines whether or not the downlink signal DS including the local ID # k has been received (step S75).

If determining in step S75 that the downlink signal DS including the local ID # k has been received, the sensor controller 31 derives the position of the stylus 2 based on a burst signal in the received downlink signal DS (step S76). Here, as described in detail later, the stylus 2 is so configured that, if the present timing is not immediately after registration of a new local ID, even when receiving a command signal that represents a reset order, the stylus 2 postpones the reset (cancellation of registration of the local ID) for a while and continues to carry out transmission of the downlink signal DS in response to a command signal that represents a data transmission instruction. The length of this postponement period is determined based on the value of an ID cancellation wait counter, to be described later. Therefore, in step S76, one or more positions continue to be derived for a while.

The sensor controller 31 selects the position continuous with the previously-derived position from the one or more positions derived in step S76 (step S77). In the example of FIG. 27, the stylus 2 that communicates with the sensor controller 31 until immediately before the sensor controller 31 detects overlapping is the stylus 2*b*. Thus, in step S77, the position derived based on the downlink signal DS of the stylus 2*b* is selected.

Subsequently, the sensor controller 31 determines whether or not the selection of the position in step S77 is possible (step S78). As described above, after receiving a command signal that represents a reset order, the stylus 2 continues to respond to the command signal that represents a data transmission instruction for the period determined based on the value of the ID cancellation wait counter. Therefore, possibly there is the case in which the stylus 2 existing at the position continuous with the previously-derived position stops responding sooner than the other styluses 2. In this case, it is determined that the selection is not possible in step S78.

If determining that the selection is possible in step S78, the sensor controller 31 sets 0 in the deletion counter of the local ID # k in the ID management table 70 (step S79) and extracts data included in a data signal in the downlink signal DS corresponding to the selected position (step S80). Due to this, only the coordinates x and y that represent the position of the stylus 2 existing at the position continuous with the previously-derived position, its local ID, and its data are reported to the electronic apparatus controller 33. Furthermore, the sensor controller 31 readjusts the transmission schedule depending on the contents of the data (for example, the case in which the extracted data is a global ID, or the like) (step S81) and thereafter ends the command signal transmission processing and returns to step S1 in FIG. 9.

If determining in step S75 that the downlink signal DS including the local ID # k has not been received or if determining in step S78 that the selection is not possible, the sensor controller 31 determines whether or not the deletion counter (see FIG. 8) of the local ID # k is larger than the predetermined threshold D (step S82). If determining that the deletion counter is not larger, the sensor controller 31 increments the deletion counter of the local ID # k by 1 (step S85). On the other hand, if determining that the deletion counter is larger, the sensor controller 31 cancels the registration of the local ID # k by deleting the row of the local ID # k from the ID management table 70 (step S83). This eliminates the case in which the local ID # k is determined as the transmission target in step S20 in FIG. 11. Therefore, the transmission of the command signal that represents a data transmission instruction of the local ID # k in step S73 is also stopped. Then, in order to allocate opportunities for transmission of the downlink signal DS previously given to the stylus 2 corresponding to the local ID # k to other styluses 2, the sensor controller 31 readjusts the transmission schedule of the downlink signal DS and updates the ID management table 70 based on the result thereof (step S84). The sensor controller 31 that has ended the processing of step S84 ends the command signal transmission processing and returns to step S1 in FIG. 9.

The operation of the sensor controller 31 relating to the present disclosure is described in detail above. Next, the operation of the stylus 2 relating to the present disclosure will be described in detail.

Figure 16:
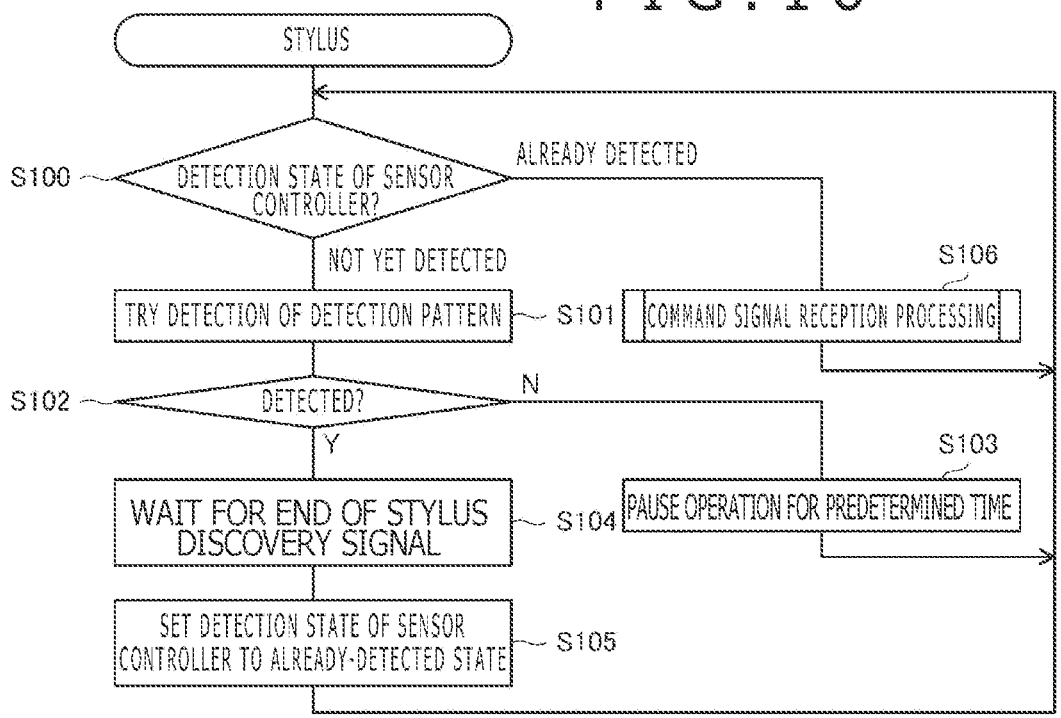
FIG. 16 is a flowchart depicting a processing flow of the styluses 2a to 2c depicted in FIG. 1.

As depicted in FIG. 16, first the stylus 2 determines the detection state of the sensor controller 31 (step S100). If determining that the detection state is the undetected state in which the sensor controller 31 has not yet been detected, the stylus 2 tries detection of the above-described detection pattern c1 (step S101). This processing is processing for detecting the stylus discovery signal intermittently transmitted by the sensor controller 31.

Next, the stylus 2 determines whether or not the detection pattern c1 has been detected as the result of the trial in step S101 (step S102). If determining that the detection pattern c1 has not been detected, the stylus 2 pauses the operation for a predetermined time (step S103) and then returns to step S100 to repeat the trial of detection of the detection pattern c1. The pause in the operation in step S103 is for suppressing the power consumption of the stylus 2 by intermittently carrying out the reception operation. On the other hand, if determining in step S102 that the detection pattern c1 has been detected, the stylus 2 waits for the end of the stylus discovery signal (step S104). As described above, the stylus discovery signal is a signal composed of repetition of the known detection pattern c1 and the delimiter pattern STP added to the tail end. Therefore, the stylus 2 detects the end of the detection pattern by detecting the delimiter pattern STP. Thereafter, the stylus 2 sets the detection state of the sensor controller 31 to the already-detected state (step S105) and returns to step S100.

If determining in step S100 that the detection state is the already-detected state, the stylus 2 executes command signal reception processing (step S106).

Figure 17:
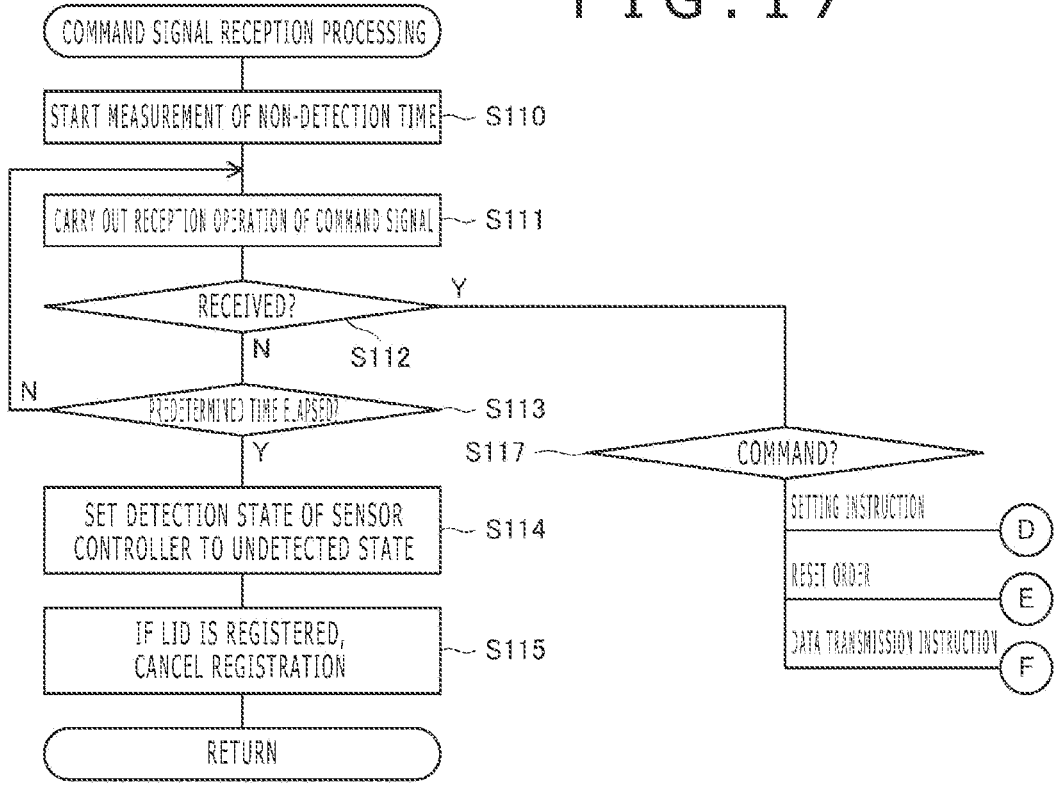
FIG. 17 is a flowchart depicting a detailed flow of command signal reception processing depicted in FIG. 16.

In FIG. 17, details of the command signal reception processing are depicted. As depicted in this diagram, the stylus 2 that has started the command signal reception processing starts measurement of the non-detection time of the uplink signal US (step S110). Then, the stylus 2 carries out reception operation of the command signal (step S111) and determines whether or not a command signal has been received (step S112).

If determining in step S112 that a command signal has not been received, the stylus 2 determines whether or not a predetermined time has elapsed from the start of the measurement of the non-detection time in step S110 (step S113). This predetermined time is a time shorter than one second, for example, such as several hundreds of milliseconds. If it is determined that the predetermined time has not elapsed, the stylus 2 returns to step S111 and carries out the reception operation of the command signal again. On the other hand, if determining that the predetermined time has elapsed (that is, if the uplink signal US is not detected for the predetermined period), the stylus 2 sets the detection state of the sensor controller 31 to the undetected state (step S114). In addition, if a local ID is registered in the memory 45 (see FIG. 2), the stylus 2 cancels the registration of the local ID by deleting it (step S115). Thereafter, the stylus 2 ends the command signal reception processing and returns to step S100 in FIG. 16. The processing of the steps S114 and S115 is processing executed when the stylus 2 moves to a height that surpasses the uplink detection height AH depicted in FIG. 1 and becomes incapable of receiving the uplink signal US.

Here, if a local ID has been already registered in the memory 45, the stylus 2 may cancel the registration of the local ID not only when the uplink signal US is not detected for the predetermined period as described above but also when the uplink signal US including the local ID registered in the memory 45 is not detected for the predetermined period. Due to this, for example when the state occurs in which, from the viewpoint of the stylus 2, the uplink signal US can be detected but the uplink signal US including its own local ID is not detected no matter how long the stylus 2 waits, such as when the stylus 2 stores a local ID in the memory 45 and remains at a position lower than the uplink detection height AH but the local ID is not registered (has been already canceled) in the sensor controller 31, a new local ID can be allocated from the sensor controller 31 to the stylus 2 without movement of the stylus 2 to a position higher than the uplink detection height AH.

On the other hand, if determining in step S112 that a command signal has been received, the stylus 2 resets the value of the non-detection time and determines which of "setting instruction," "reset order," and "data transmission instruction" is included in a command represented by the received command signal (step S117).

<Operation in Response to ID Setting Instruction>

Figure 18:
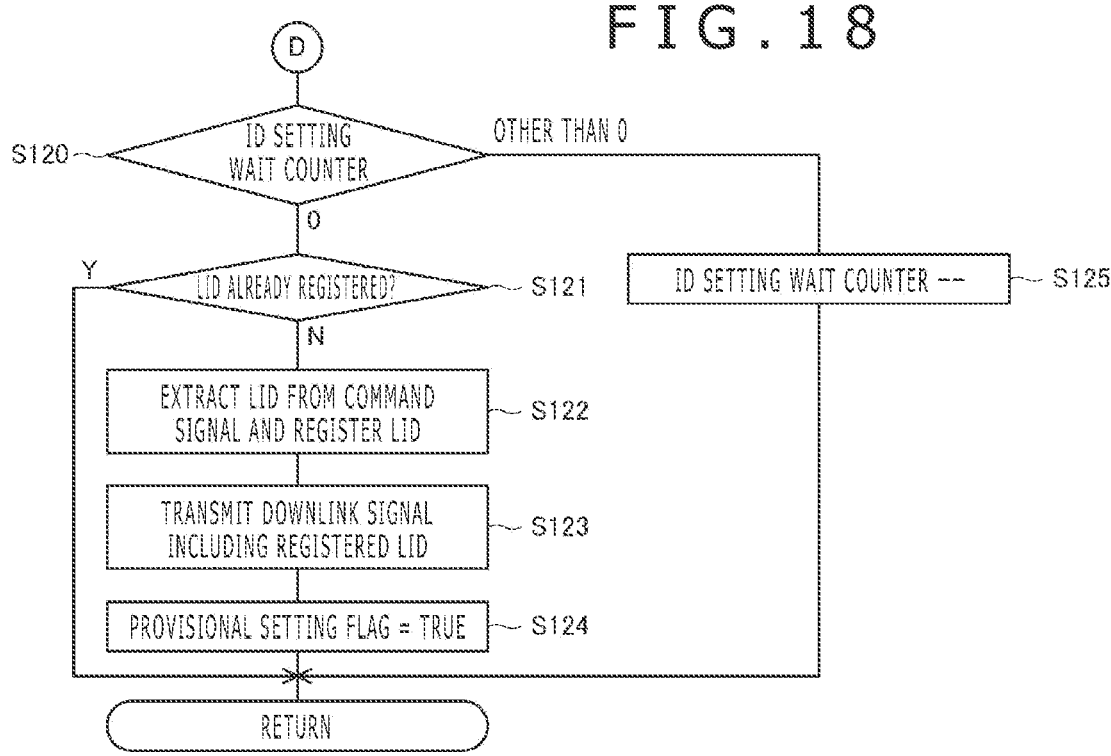
FIG. 18 is a flowchart depicting the detailed flow of the command signal reception processing depicted in FIG. 16.

FIG. 18 depicts processing in the case in which the command is determined as the "setting instruction" in step S117 in FIG. 17. In this case, first the stylus 2 determines whether or not the ID setting wait counter is 0 (step S120). The ID setting wait counter represents the period during which the stylus 2 that has received an ID setting instruction does not immediately reflect (ignores) the setting instruction although the setting instruction is present. The ID setting wait counter is set in a step S135 to be described later and is 0 in the initial state. If the ID setting wait counter is not 0, the stylus 2 executes processing of decrementing the ID setting wait counter by 1 (step S125). Thereafter, the stylus 2 ends the command signal reception processing and returns to step S100 in FIG. 16. In this case, the setting instruction of a local ID by the sensor controller 31 is ignored by the stylus 2.

On the other hand, if the ID setting wait counter is 0, the stylus 2 determines whether or not a local ID has been already registered in its own memory 45 (see FIG. 2) (step S121). If determining that a local ID has been already registered here, the stylus 2 ends the command signal reception processing without executing particular processing and returns to step S100 in FIG. 16. On the other hand, the stylus 2 in the case of determining that a local ID has not been already registered extracts the local ID from the command signal and registers the local ID in its own memory 45 (step S122). Then, the stylus 2 transmits the downlink signal DS including the registered local ID (step S123) and sets "TRUE" in a provisional setting flag (step S124). Thereafter, the stylus 2 ends the command signal reception processing and returns to step S100 in FIG. 16. That the provisional setting flag is "TRUE" means that the setting of the local ID is provisional. That the provisional setting flag is "FALSE" means that the local ID held in the memory is settled.

<Operation in Response to Reset Order>

Figure 19:
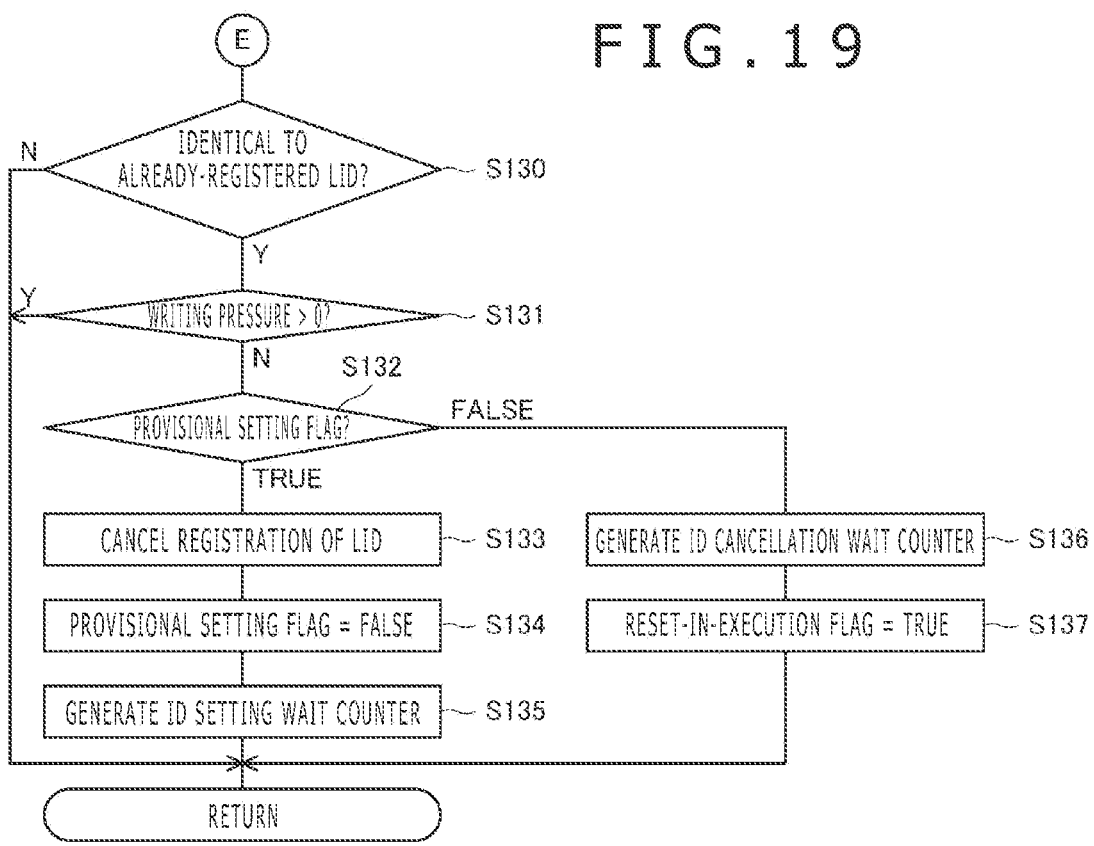
FIG. 19 is a flowchart depicting the detailed flow of the command signal reception processing depicted in FIG. 16.

FIG. 19 depicts processing in the case in which the command is determined as the "reset order" in step S117 in FIG. 17. The stylus 2 in this case first determines whether or not the received command signal includes the already-registered local ID (step S130). If determining that the command signal does not include the already-registered local ID, the stylus 2 ends the command signal reception processing without executing particular processing and returns to step S100 in FIG. 16. This is processing for ignoring the command signal that is not addressed to itself. On the other hand, if determining that the command signal includes the already-registered local ID, subsequently the stylus 2 determines whether or not the writing pressure detected by the writing pressure detecting sensor 23 (FIG. 2) surpasses 0 (step S131). If the writing pressure surpasses 0, the stylus 2 ends the command signal reception processing without executing particular processing and returns to step S100 in FIG. 16. This means that the processing is continued without obeying the reset order in the case in which the stylus 2 has been already used on the panel operation surface and pen touch operation is being carried out or the like (typically the case in which rendering processing or the like with use of the stylus 2 has been started). On the other hand, if the writing pressure is 0, subsequently the stylus 2 determines the value of the provisional setting flag (step S132).

If the provisional setting flag is "TRUE," the stylus 2 cancels the registration of the local ID by deleting the local ID from the memory 45 (step S133). Thereby, the stylus 2 becomes the state in which a local ID is unregistered. Subsequently, the stylus 2 sets "FALSE" in the provisional setting flag (step S134) and generates the ID setting wait counter (step S135). Thereafter, the stylus 2 ends the command signal reception processing and returns to step S100 in FIG. 16.

Determination in step S132 that the provisional setting flag is set "TRUE" means that the command signal that represents the reset order is transmitted immediately after the stylus 2 has registered the local ID. This is the case in which, as exemplified in FIG. 26, plural styluses 2 respond to a setting instruction of the local ID transmitted by the sensor controller 31. The ID setting wait counter generated in step S135 represents the period during which the stylus 2 that has received a reset order in such a case ignores the setting instruction. It suffices that the values of the ID setting wait counter and the ID cancellation wait counter generated in a step S136 to be described later are values different for each of the styluses 2. These values may be generated from a serial number of a global ID or the like, or predetermined values prioritized according to the device type. Alternatively, the values may be generated by a random number generator. Because the setting instruction is ignored by the respective styluses 2 for the period according to the ID setting wait counter in this manner, it becomes possible to reallocate the same local ID to only one of the styluses 2 as described above with reference to FIG. 26.

Referring back to FIG. 19, if determining in step S132 that the provisional setting flag is "FALSE," the stylus 2 generates the ID cancellation wait counter (step S136) and sets "TRUE" in a reset-in-execution flag (step S137). Then, the stylus 2 ends the command signal reception processing and returns to step S100 in FIG. 16.

The case in which it is determined in step S132 that the provisional setting flag is "FALSE" means that the command signal that represents the reset order is transmitted not when the local ID is provisionally set, such as immediately after the stylus 2 has registered the local ID, but after the local ID has been already settled. This is the case in which, as described with reference to FIG. 27, two or more styluses 2 simultaneously transmit the downlink signal DS including the same local ID in response to a command signal that represents a data transmission instruction. The ID cancellation wait counter generated in step S136 represents the time by which the stylus 2 that has received a reset order in such a case delays execution of registration cancellation of the local ID. Due to the delaying of execution of registration cancellation of the local ID by the respective styluses 2 for the period according to the ID cancellation wait counter in this manner, it becomes possible for the sensor controller 31 to continuously carry out position detection of the stylus 2 and data acquisition from the stylus 2 as exemplified in FIG. 27. As described with reference to FIG. 15, in such a case, the sensor controller 31 deems only the downlink signal DS corresponding to the position continuous with the previous derived position as the target of processing (steps S76 to S81). Thus, position detection and data acquisition are carried out, not for the stylus 2 that has newly entered the sensing range SR (in FIG. 27, stylus 2a), but only for the stylus 2 that continuously remains in the sensing range SR (in FIG. 27, stylus 2b). Therefore, after a user has caused a certain stylus 2 (first stylus 2) to make pen touch and begun to use the certain stylus 2 on the panel surface, if another stylus 2 that has been kept lower than the uplink detection height AH (second stylus 2) enters the sensing range SR after a certain time lag, with respect to a local ID generated at this time, the sensor controller 31 can implement operation of detecting coordinates by continuously using the coordinate values having higher probability of being of the first stylus 2, and reporting the coordinates to the electronic apparatus controller 33.

<Operation in Response to Data Transmission Instruction>

Figure 20:
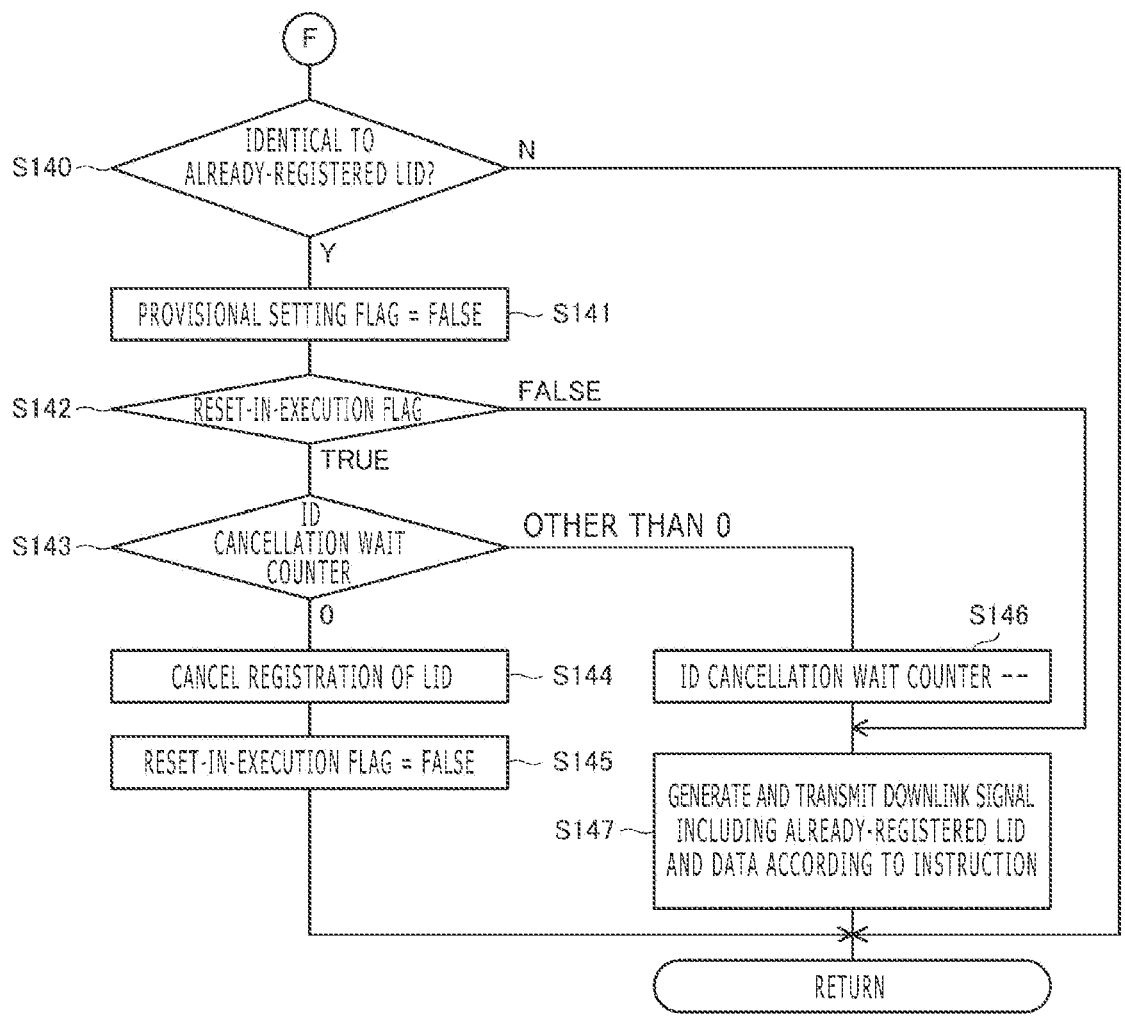
FIG. 20 is a flowchart depicting the detailed flow of the command signal reception processing depicted in FIG. 16.

FIG. 20 depicts processing in the case in which the command is determined as the "data transmission instruction" in step S117 in FIG. 17. The stylus 2 in this case first determines whether or not the received command signal includes the already-registered local ID (step S140). If determining that the command signal does not include the already-registered local ID, the stylus 2 ends the command signal reception processing about the command signal that is presently received without executing particular processing and returns to step S100 in FIG. 16 to start the next command signal reception processing. This is processing for ignoring the command signal that is not addressed to itself and starting preparation for a response to the next command. On the other hand, if determining that the command signal includes the already-registered local ID, the stylus 2 sets "FALSE" in the provisional setting flag (step S141) and subsequently determines the value of the reset-in-execution flag (step S142).

If the reset-in-execution flag is "FALSE," the stylus 2 transmits the downlink signal DS including the already-registered local ID and data instructed to be transmitted by the command signal (step S147). Then, the stylus 2 ends the command signal reception processing and returns to step S100 in FIG. 16. This processing is the normal response to the command signal that represents the data transmission instruction.

On the other hand, if determining in step S142 that the reset-in-execution flag is "TRUE," first the stylus 2 determines whether or not the ID cancellation wait counter is 0 (step S143). The initial state of the ID cancellation wait counter is 0 as with the ID setting wait counter. However, immediately after the stylus 2 receives a reset order at a timing that is not immediately after registration of a local ID, a value that is not 0 is set in the ID cancellation wait counter in step S136. If determining that the ID cancellation wait counter is not 0, the stylus 2 executes processing of decrementing the ID cancellation wait counter by 1 (step S146) and thereafter transmits the downlink signal DS including the already-registered local ID and data instructed to be transmitted by the command signal (step S147). Then, the stylus 2 ends the command signal reception processing and returns to step S100 in FIG. 16. This processing of the steps S146 and S147 is processing in the case in which the stylus 2 delays execution of registration cancellation of the local ID, as described with reference to FIG. 27.

On the other hand, if determining in step S143 that the ID cancellation wait counter is 0, the stylus 2 cancels the registration of the local ID by deleting the local ID from the memory 45 (step S144) and sets "FALSE" in the reset-in-execution flag (step S145). Then, the stylus 2 ends the command signal reception processing and returns to step S100 in FIG. 16. Thereby, the delayed registration cancellation of the local ID is executed.

As described above, according to the sensor controller 31 and the stylus 2 in accordance with the present embodiment, the sensor controller 31 allocates a local ID to the stylus 2 by a command signal that represents a setting instruction and includes the local ID in other command signals. Thereby, the sensor controller 31 can specify the stylus 2 that should respond to the command signals. Therefore, it becomes possible to flexibly change the timings when the respective styluses transmit the downlink signal DS.

Furthermore, the sensor controller 31 can specify the stylus 2 that should respond to the command signal by only including one value of a local ID in the command signal. Thus, it becomes possible to decrease the size of the command signal compared with the case in which the timings when the respective styluses 2 transmit the downlink signal DS are determined by a negotiation carried out in advance.

Moreover, if determining that a received command signal does not include the already-registered local ID in step S130 or step S140, the stylus 2 can immediately move to reception operation of the next command signal (step S111). Therefore, it becomes possible to advantageously receive the next command signal irrespective of the length of the downlink signal DS transmitted from the other styluses 2.

Although the preferred embodiment of the present disclosure is described above, it is obvious that the present disclosure is not limited to such an embodiment at all and the present disclosure can be carried out in various modes without departing from the contents of the disclosure.

For example, in the above-described embodiment, description is made based on the assumption that the position detecting system 1 includes the two pen-type styluses 2a and 2b and the one ruler-type stylus 2c. However, the number of styluses 2 included in the position detecting system 1 is not limited thereto. The present disclosure can be applied to the position detecting system 1 including any number of plural styluses 2, irrespective of their form.

Figure 28:
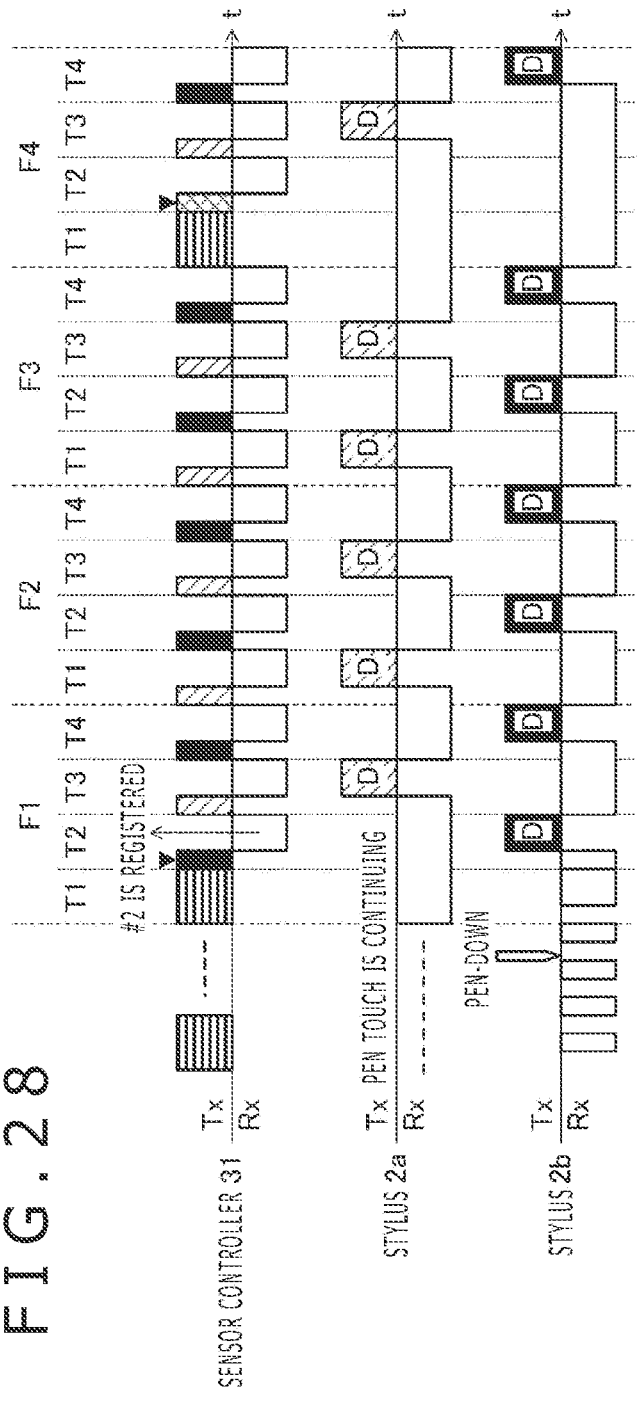
FIG. 28 is a time chart depicting signals transmitted and received between the styluses 2a and 2b and the sensor controller 31 according to a first modification example of the embodiment of the present disclosure (a case in which the sensor controller 31 newly registers the stylus 2b).
Figure 29:
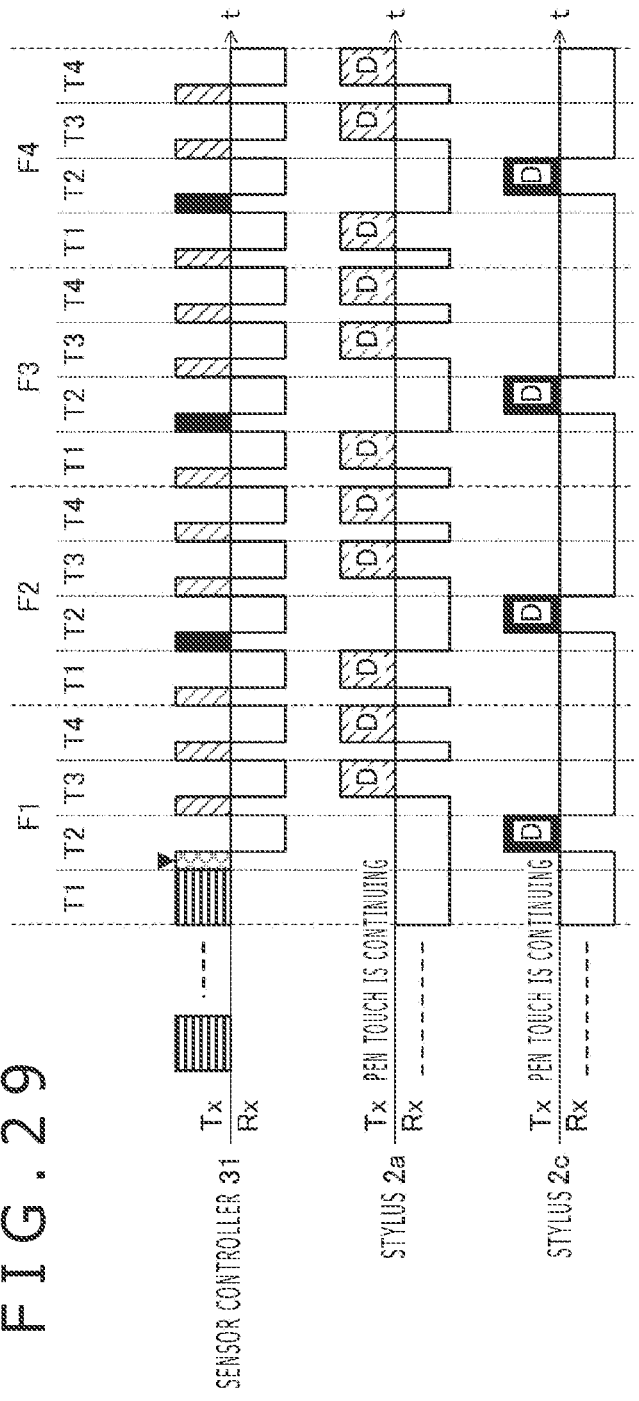
FIG. 29 is a time chart depicting signals transmitted and received between the styluses 2a and 2c and the sensor controller 31 according to the first modification example of the embodiment of the present disclosure (a case in which writing by the styluses 2a and 2c is carried out).

FIG. 28 and FIG. 29 are each a time chart depicting signals transmitted and received between the styluses 2a and 2b and the sensor controller 31 according to a first modification example of the embodiment of the present disclosure. FIG. 28 depicts a case in which the sensor controller 31 registers the stylus 2a and thereafter additionally registers the stylus 2b, similarly to FIG. 22. FIG. 29 depicts a case in which normal writing by the styluses 2a and 2c is carried out after the sensor controller 31 readjusts the transmission schedule based on the device type of each of the styluses 2a and 2c, similarly to FIG. 24.

In the present modification example, communication between the styluses 2a and 2b and the sensor controller 31 is carried out by the above-described frame communication. This frame communication is carried out by using frames F1, F2, each including four slots T1 to T4. The number of slots in one frame is not limited to four. As described above, each frame is the display operation period of the liquid crystal panel 32 (see FIG. 1) and the timing of each slot is determined based on the blank period of the liquid crystal panel 32. The sensor controller 31 determines the timing and time length of each slot and the number of slots included in each frame by observing noise generated from the liquid crystal panel 32 or acquiring information from the liquid crystal panel 32. These pieces of determined information are notified from the sensor controller 31 to the stylus 2 in the uplink signal US.

The sensor controller 31 is configured to transmit the stylus discovery signal every predetermined number (in FIG. 28, three) of frames, by using the first slot T1 thereof. Furthermore, the sensor controller 31 is configured to transmit a command signal at the beginning of each of the other slots. Meanwhile, the stylus 2 is configured to, when receiving the command signal, transmit the downlink signal DS in response to the command signal.

Also in the present modification example, the continuous transmission time of the downlink signal DS possibly differs depending on the specifications of the stylus 2. When acquiring the continuous transmission time of the downlink signal DS of the stylus 2 based on the received global ID, the sensor controller 31 determines the transmission schedule based on the acquired continuous transmission time of the downlink signal DS and writes the transmission schedule to the ID management table 70. Then, the sensor controller 31 controls the transmission interval of the command signal in order to realize the written continuous transmission time of the downlink signal DS. If the continuous transmission time of the downlink signal DS is too long to fall within one slot, the sensor controller 31 accommodates the continuous transmission time of the downlink signal DS by skipping transmission of the uplink signal US at the beginning of the slot.

The present modification example is the same as the above-described embodiment in the other aspects. Therefore, also according to the present modification example, it is possible to register a new local ID in both the stylus 2 and the sensor controller 31 by a command signal that represents a setting instruction of the local ID as depicted in FIG. 28, and it is also possible to change the scan rate depending on the local ID as exemplified in FIG. 29.

As described above, according to the present modification example, the sensor controller 31 transmits the command signal including the value of the local ID at every transmission time. Thus, the sensor controller 31 can specify the stylus 2 that should transmit the downlink signal DS in the transmission time. Therefore, it becomes possible to flexibly change allocation of the transmission time to each stylus 2 in units of the slot shorter than the frame. Furthermore, by only including one value of the local ID in the command signal, it becomes possible to order allocation of the transmission time (in the present modification example, slot) from the sensor controller 31 to each stylus 2. Thus, it becomes possible to decrease the size of the uplink signal to indicate the allocation of the slot as the transmission time, compared with the case in which the uplink signal to indicate the allocation of the slot is broadcast to each stylus in each frame as described above.

Figure 30:
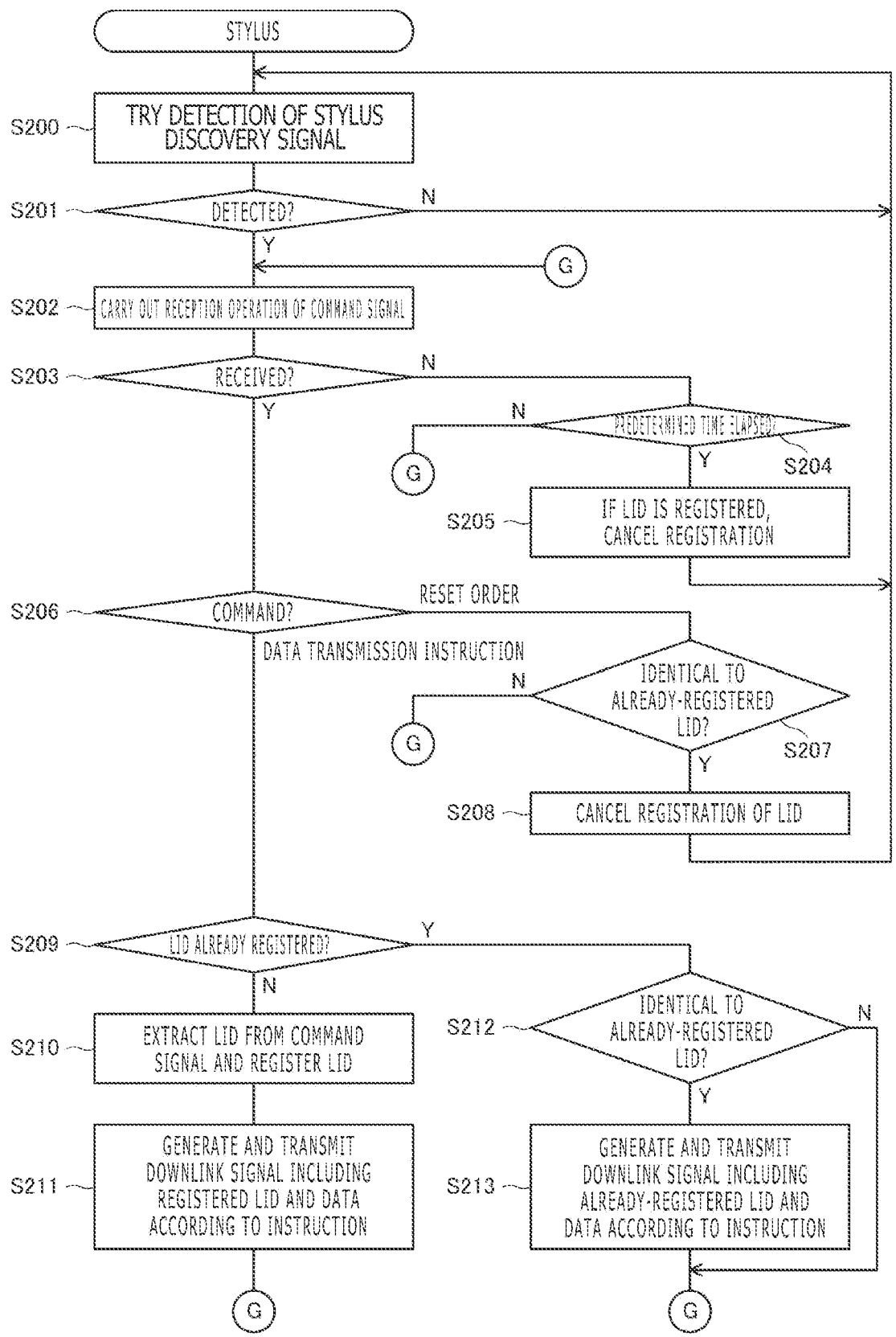
FIG. 30 is a flowchart depicting a processing flow of the stylus 2 according to a second modification example of the embodiment of the present disclosure.

FIG. 30 is a flowchart depicting a processing flow of the stylus 2 according to a second modification example of the embodiment of the present disclosure. The present modification example is different from the above-described embodiment in that the command signal that represents the "data transmission instruction" doubles as the "setting instruction," in that the period during which the stylus 2 ignores the setting instruction (FIG. 26) is not set, in that the stylus 2 that has received a reset order postpones cancellation of registration of the local ID (FIG. 27) is not set, in that determination of the writing pressure is not carried out before registration of the local ID is canceled (cancellation of registration of the local ID is carried out irrespective of the writing pressure), and so forth. Operation of the stylus 2 according to the present modification example will be described below with reference to FIG. 30.

The stylus 2 according to the present modification example first tries detection of the stylus discovery signal (step S200) and determines whether or not the stylus discovery signal has been detected (step S201). Concrete contents of the stylus discovery signal and the method of the detection may be the same as the above-described embodiment. In this case, it is when the delimiter pattern STP is detected that the positive determination is made in step S201.

If obtaining the negative determination in step S201, the stylus 2 returns to step S200 and repeats trying to detect the stylus discovery signal. On the other hand, the stylus 2 in the case of obtaining the positive determination in step S201 carries out reception operation of the command signal (step S202) and determines whether or not a command signal has been received (step S203). The processing of the steps S202 and S203 is the same processing as the steps S111 and S112 depicted in FIG. 17.

If obtaining the negative determination in step S203, the stylus 2 determines whether or not a predetermined time has elapsed from the last reception of the command signal (step S204). If determining that the predetermined time has not elapsed, the stylus 2 returns to step S202 and repeats the reception operation of the command signal. In the case in which the stylus 2 determines that the predetermined time has elapsed, if a local ID is registered in the memory 45 (see FIG. 2) at the timing, the stylus 2 cancels the registration of the local ID by deleting the local ID from the memory 45 (step S205) and returns to step S200.

The stylus 2 in the case of obtaining the positive determination in step S203 determines whether a command represented by the received command signal is which one of "reset order" or "data transmission instruction" (step S206). In the present modification example, the command signal that represents the "data transmission instruction" doubles as the "setting instruction" as described above. Thus, the contents of the command discriminated in step S206 are two types, differently from step S117 in FIG. 17, in which three types of command contents are differentiated.

If it is determined in step S206 that the command is the "reset order," the stylus 2 determines whether or not the received command signal includes the already-registered local ID (step S207). Then, if determining that the command signal does not include the already-registered local ID, the stylus 2 returns to step S202 and repeats the reception operation of the command signal. If determining that the command signal includes the already-registered local ID, the stylus 2 cancels the registration of the local ID by deleting the local ID from the memory 45 (step S208) and returns to step S200.

If determining in step S206 that the command is the "data transmission instruction," subsequently the stylus 2 determines whether or not a local ID has been already registered in its own memory 45 (step S209). Then, if a local ID has not been registered, the stylus 2 extracts a local ID from the received command signal and registers the local ID in the memory 45 (step S210). Then, the stylus 2 transmits the downlink signal DS including the registered local ID and data instructed to be transmitted by the command signal (step S211). Thereafter, the stylus 2 returns to step S202 and repeats the reception operation of the command signal.

The stylus 2 in the case of determining in step S209 that a local ID has been already registered subsequently determines whether or not the received command signal includes the already-registered local ID (step S212). Then, if determining that the command signal does not include the already-registered local ID, the stylus 2 returns to step S202 and repeats the reception operation of the command signal. On the other hand, if determining that the command signal includes the already-registered local ID, the stylus 2 transmits the downlink signal DS including the already-registered local ID and data instructed to be transmitted by the command signal (step S213). Thereafter, the stylus 2 returns to step S202 and repeats the reception operation of the command signal.

Also according to the present modification example, the sensor controller 31 allocates a local ID to the stylus 2 by a command signal that represents a setting instruction and includes the local ID in other command signals. Thereby, the sensor controller 31 can specify the stylus 2 that should respond to the command signals. Therefore, it becomes possible to flexibly change the timings when the respective styluses transmit the downlink signal DS.

Furthermore, the sensor controller 31 can specify the stylus 2 that should respond to the command signal by only including one value of a local ID in the command signal. Thus, it becomes possible to decrease the size of the command signal compared with the case in which the timings when the respective styluses 2 transmit the downlink signal DS are determined by a negotiation carried out in advance.

Moreover, in the present modification example, the command signal that represents the "data transmission instruction" doubles as the "setting instruction." Thus, the stylus 2 can transmit the normal downlink signal DS including data in step S211 immediately after a local ID is registered.

Therefore, the opportunity for transmission of the downlink signal DS can be increased by one time compared with the case in which the reply to the "setting instruction" is carried out by the downlink signal DS that does not include data.

In the above-described embodiment, the downlink signal DS is configured to include two signals—the burst signal and the data signal. However, the downlink signal DS may include only one of these two signals, such as only the burst signal or only the data signal.

Furthermore, in the above-described embodiment, the example is described in which transmission of a global ID is carried out by using the downlink signal DS using capacitive coupling. However, because the global ID is static information different from the operation state that changes depending on the timing of reception of the uplink signal US, the global ID may be notified from the stylus 2 to the sensor controller 31 by another proximity wireless communication measure such as Bluetooth®, for example. Due to this, in communication using capacitive coupling, the communication time for transmitting the global ID can be reduced. This can increase the opportunity for transmission of the data signal including operation states such as a writing pressure value and the pressing-down state of a switch.

Moreover, in the above-described embodiment, it is explained that there are two types of signals—the stylus discovery signal and the command signal—in the uplink signal US. However, the stylus discovery signal may include a local ID setting instruction command to the new undetected stylus 2. This allows the stylus 2 to immediately set a local ID at the timing of reception of the stylus discovery signal.

Furthermore, in the above-described embodiment, the example is described in which the values of symbols that take multiple values such as "P," "M," and "0 to 15" are used as the transmission method of the control information c2, the detection pattern c1, the delimiter pattern STP, and so forth. However, these pieces of information or patterns may be transmitted by another transmission method, e.g., a transmission method using a modulation system such as OOK or PSK.

DESCRIPTION OF REFERENCE SYMBOLS

1 Position detecting system
2, 2a to 2c Stylus
3 An electronic apparatus
20a Core body
20b Ruler
21, 21_1 to 21_n Electrode
22 Switch
23 Writing pressure detecting sensor
24 Signal processing circuit
25, 26 Switch
27 Switching circuit
30 Sensor electrode
30X, 30Y linear electrode
31 Sensor controller
32 Liquid crystal panel
33 An electronic apparatus controller
40 Switching circuit
41 Receiver circuit
42 Waveform regenerating circuit
43 Correlation arithmetic circuit
44 Controller
45 Memory
46 Transmitter circuit
47 Modulating circuit 48 Booster circuit
50 Six-axis IMU
51 Global ID storing circuit
60 MCU
61 Logic circuit
62 Transmitter circuit
63 Receiver circuit
64 Selection circuit
70 ID management table
71 ID managing circuit
72 Position deriving circuit
73 State detecting circuit
80 Pattern supply circuit
81 Switch
82 Code sequence holding circuit
83 Spreading processing circuit
84 Transmission guard circuit
85 Amplification circuit
86 Detection circuit
87 AD converter
88$x$, 88$y$ Switch
89$x$, 89$y$ Conductor selection circuit
DS Downlink signal
GID Global ID
LID Local ID
SR Sensing range
US Uplink signal

The invention claimed is:

1. A stylus that bi-directionally transmits and receives a signal to and from a sensor controller connected to a sensor using capacitive coupling, the stylus comprising:
   a memory which, in operation, temporarily stores a value of a local identifier; and
   a processor which, every time an uplink signal transmitted by the sensor controller is detected, determines whether or not the uplink signal that is detected includes the value of the local identifier stored in the memory and, in response to determining that the detected uplink signal includes the value of the local identifier stored in the memory, generates a downlink signal and transmits the downlink signal to the sensor controller,
   wherein the processor, in operation, deletes the value of the local identifier stored in the memory when the uplink signal is not detected for a defined time or when the uplink signal including the value of the local identifier stored in the memory is not detected for a defined period.

2. The stylus according to claim 1, wherein in response to determining that the uplink signal that is detected includes the value of the local identifier stored in the memory, the processor generates the downlink signal based on an operation state at that time and transmits the downlink signal to the sensor controller.

3. The stylus according to claim 1, wherein the processor, in operation, generates the downlink signal including the value of the local identifier stored in the memory and transmits the downlink signal to the sensor controller.

4. The stylus according to claim 1, further comprising:
   a global identifier storing circuit which, in operation, stores a global identifier, which is information having a larger number of bits compared with the local identifier and based on which the stylus is distinguished from other styluses, wherein
      the memory is a volatile memory, and
      the global identifier storing circuit is a non-volatile memory.

5. The stylus according to claim 1, wherein the processor, in operation, determines whether or not the uplink signal includes a setting instruction of a value of a local identifier and, in response to determining that the uplink signal includes the setting instruction, determines whether or not the value of the local identifier of the setting instruction is stored in the memory and, in response to determining that the value of the local identifier of the setting instruction is not stored in the memory, causes the memory to store the value of the local identifier of the setting instruction included in the uplink signal.

6. The stylus according to claim 5, wherein the processor, in operation, causes the memory to store the value of the local identifier of the setting information included in the uplink signal, generates a downlink signal including the value of the local identifier of the setting information and transmits the downlink signal to the sensor controller.

7. A stylus that bi-directionally transmits and receives a signal to and from a sensor controller connected to a sensor using capacitive coupling, the stylus comprising:
   a memory which, in operation, temporarily stores a value of a local identifier; and
   a processor which, every time an uplink signal transmitted by the sensor controller is detected, determines whether or not the uplink signal that is detected includes the value of the local identifier stored in the memory and, in response to determining the detected uplink signal includes the value of the local identifier stored in the memory, generates a downlink signal and transmits the downlink signal to the sensor controller,
   wherein the processor, in operation, determines whether or not the uplink signal includes a reset order and, in response to determining that the uplink signal includes the reset order, deletes the value of the local identifier stored in the memory.

8. The stylus according to claim 7, wherein the processor, in operation, determines whether or not the uplink signal includes the reset order and, in response to determining that the uplink signal includes the reset order, continues transmission of a downlink signal including the value of the local identifier stored in the memory for a defined period.

9. The stylus according to claim 7, further comprising:
   a writing pressure detecting circuit that detects a writing pressure, wherein
      the processor, in operation, deletes the value of the local identifier stored in the memory when a writing pressure higher than 0 is not detected by the writing pressure detecting circuit and when the uplink signal includes the reset order.

10. A sensor controller that has a function of detecting one or more styluses and reports positions of one or more styluses that have been detected to a host processor, the sensor controller comprising:
   a memory which, in operation, stores values of one or more local identifiers allocated to respective one or more styluses that have been detected; and
   a processor which, in operation, determines a scan rate for each of the one or more styluses that have been detected, selects one of the values of the one or more local identifiers stored in the memory based on the respectively determined scan rates, transmits an uplink signal including the selected value of the local identifier, and derives a position of a stylus corresponding to the selected value of the local identifier based on a downlink signal returned in response to the uplink signal, wherein the processor is configured to be capable of simultaneously deriving positions of a plurality of styluses and, when a plurality of stylus positions corresponding to the selected value of the local identifier are derived based on downlink signals returned in response to the uplink signal including the selected value of the local identifier, transmits an uplink signal that represents a reset order.

11. The sensor controller according to claim 10, wherein the processor, in operation, periodically transmits an uplink signal for detecting a new stylus that is not included in the one or more styluses that have been detected.

12. The sensor controller according to claim 11, wherein the uplink signal for detecting a new stylus includes a setting instruction for instructing a stylus to set a value of a local identifier that is not stored in the memory.

13. The sensor controller according to claim 10, wherein the processor, in operation, detects the value of the local identifier included in the downlink signal and, when one of the values of the one or more local identifiers stored in the memory is not detected for a defined period, deletes one value of the local identifier from the memory and redetermines the respective scan rates.

14. The sensor controller according to claim 10, wherein the processor, in operation, determines the scan rate for each of the one or more styluses that have been detected such that the respectively determined scan rates of the one or more styluses that have been detected are equal to each other.

15. The sensor controller according to claim 10, wherein the processor, in operation, calculates a movement velocity of each of the one or more styluses that have been detected from change in a position derived for each of the one or more styluses that have been detected, and determines the scan rate for each of the one or more styluses that have been detected such that the scan rate becomes higher when the calculated movement velocity is higher.

16. The sensor controller according to claim 10, wherein the processor, in operation, determines the scan rate for each of the one or more styluses that have been detected based on a device type of each of the one or more styluses that have been detected.

17. The sensor controller according to claim 10, wherein the processor, in operation, determines a time period, for continuously detecting the downlink signal returned from the stylus corresponding to the selected value of the local identifier, based on a device type of the stylus, and continuously detects the downlink signal for the determined time period.

18. The sensor controller according to claim 10, wherein when a plurality of stylus positions corresponding to the selected value of the local identifier are derived, the processor determines whether or not each of the plurality of stylus positions that are derived is continuous with a position previously derived, reports a position determined to be continuous to the host processor, and does not report a position determined to be not continuous to the host processor.

* * * * *